United States Patent
Creech et al.

(10) Patent No.: US 12,018,492 B2
(45) Date of Patent: Jun. 25, 2024

(54) BACKSPLASH INSTALLATION HARDWARE

(71) Applicant: Oldcastle BuildingEnvelope, Inc., Dallas, TX (US)

(72) Inventors: Nathan Bradley Creech, Austin, TX (US); Richard Braunstein, Addison, TX (US)

(73) Assignee: Oldcastle BuildingEnvelope, Inc., Dallas, TX (US)

( * ) Notice: Subject to any disclaimer, the term of this patent is extended or adjusted under 35 U.S.C. 154(b) by 3 days.

(21) Appl. No.: 17/325,930

(22) Filed: May 20, 2021

(65) Prior Publication Data
US 2021/0363758 A1    Nov. 25, 2021

Related U.S. Application Data

(60) Provisional application No. 63/027,862, filed on May 20, 2020.

(51) Int. Cl.
*F16B 13/04*    (2006.01)
*E04F 13/08*    (2006.01)
*F16B 13/00*    (2006.01)

(52) U.S. Cl.
CPC ...... *E04F 13/0833* (2013.01); *E04F 13/0883* (2013.01); *F16B 2013/009* (2013.01)

(58) Field of Classification Search
CPC .. F16B 2013/009; F16B 37/14; E04F 13/0846
USPC ............ 411/531, 372.5, 368, 549, 349, 166; 52/506.1
See application file for complete search history.

(56) References Cited

U.S. PATENT DOCUMENTS

| | | | | |
|---|---|---|---|---|
| 2,069,500 | A * | 2/1937 | McGarry | B60R 13/105 40/202 |
| 2,523,652 | A * | 9/1950 | Dowd | A43C 15/161 411/141 |
| 4,214,505 | A * | 7/1980 | Aimar | F16B 21/08 411/510 |
| 4,601,624 | A * | 7/1986 | Hill | A47G 3/00 411/431 |
| 4,621,230 | A * | 11/1986 | Crouch | G09F 3/0323 411/910 |
| 4,631,887 | A * | 12/1986 | Francovitch | E04D 5/147 52/309.1 |
| 4,686,808 | A * | 8/1987 | Triplett | E04D 5/145 52/410 |
| 5,827,029 | A * | 10/1998 | Denman | F16B 41/005 411/429 |
| 5,879,117 | A * | 3/1999 | Chen | B60R 13/105 411/372.6 |
| 5,988,966 | A * | 11/1999 | Chen | F16B 37/14 411/372 |
| 9,011,062 | B2 * | 4/2015 | Chirol | B64D 45/02 411/372.5 |
| 2011/0094071 | A1 * | 4/2011 | Veldhoen | F16B 5/0692 24/598.4 |

(Continued)

*Primary Examiner* — Gary W Estremsky
(74) *Attorney, Agent, or Firm* — Kilpatrick Townsend & Stockton LLP

(57) ABSTRACT

Systems and method for supporting a cover material to a support material include a coupling device that includes an inner coupler and an outer coupler. The inner coupler and the outer coupler are separably joined. The inner coupler may be attached to the support material, and the outer coupler may be attached to the cover material.

17 Claims, 27 Drawing Sheets

(56) References Cited

U.S. PATENT DOCUMENTS

2016/0305130 A1* 10/2016 Richardson ......... E04F 19/0463
2020/0288818 A1* 9/2020 Barrah .................... A47G 3/00
2020/0378427 A1* 12/2020 Tjerrild ................ F16B 5/0685

* cited by examiner

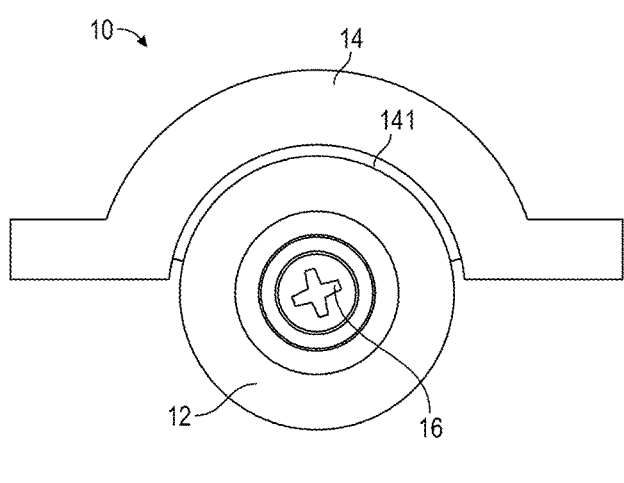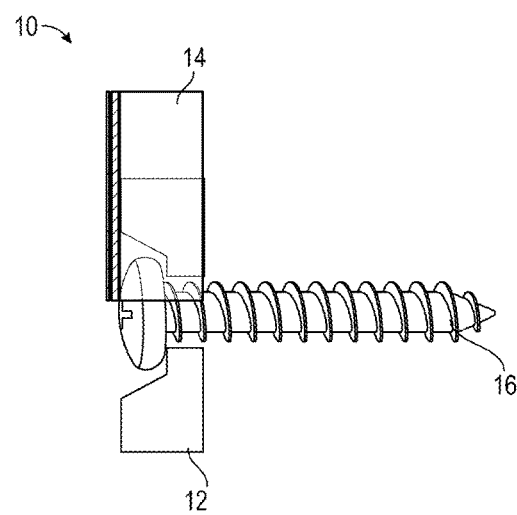
FIG. 1
FIG. 2

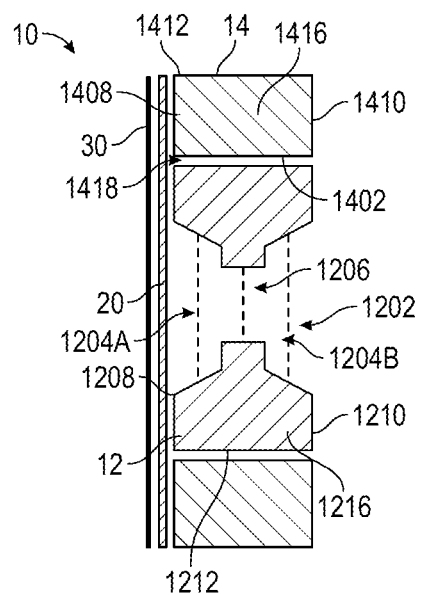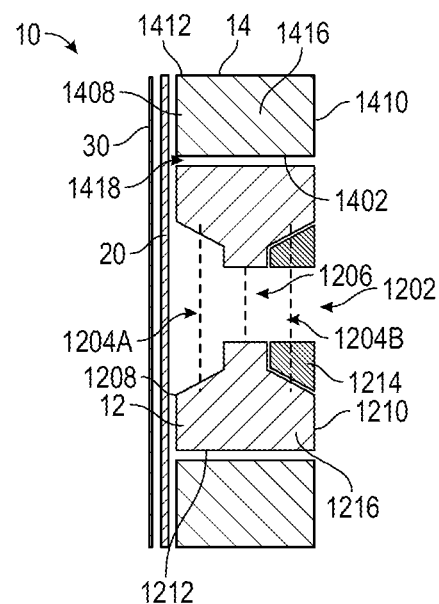
FIG. 9B
FIG. 9C

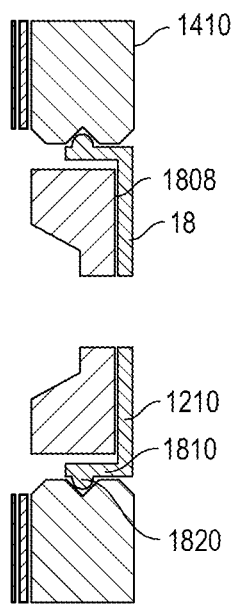
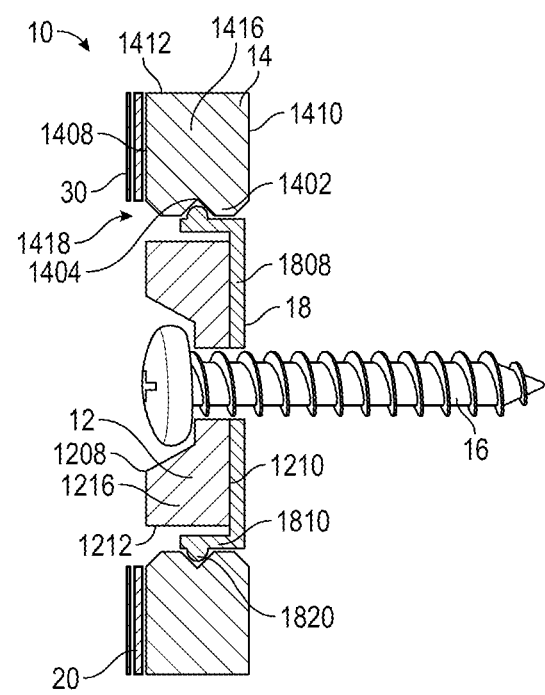
FIG. 15
FIG. 16

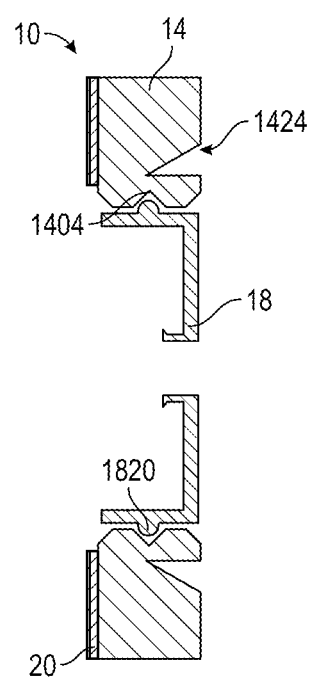
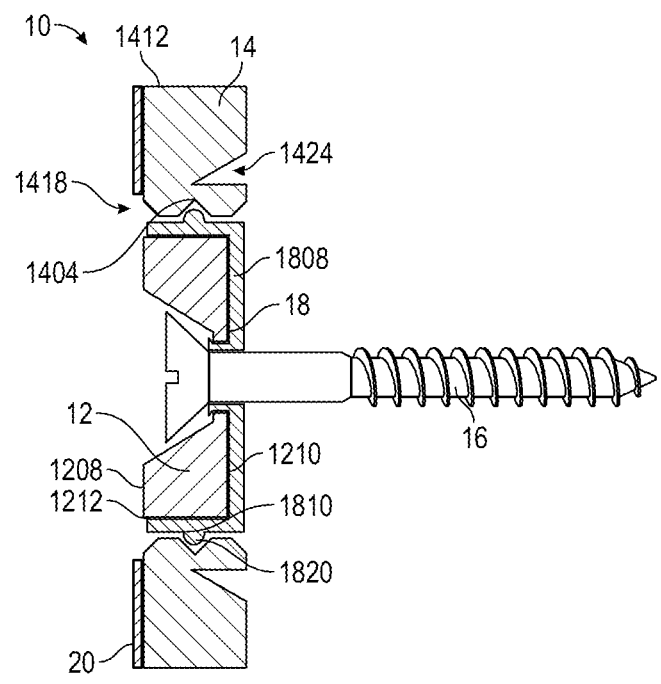
FIG. 25
FIG. 26

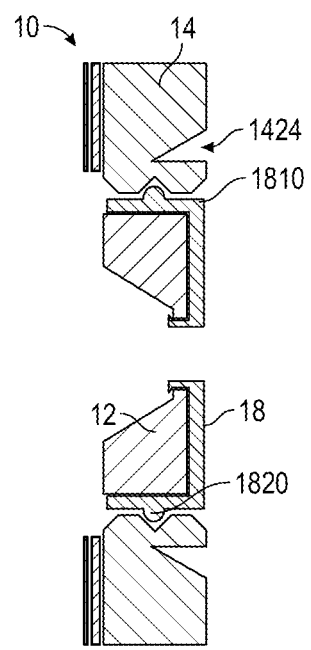
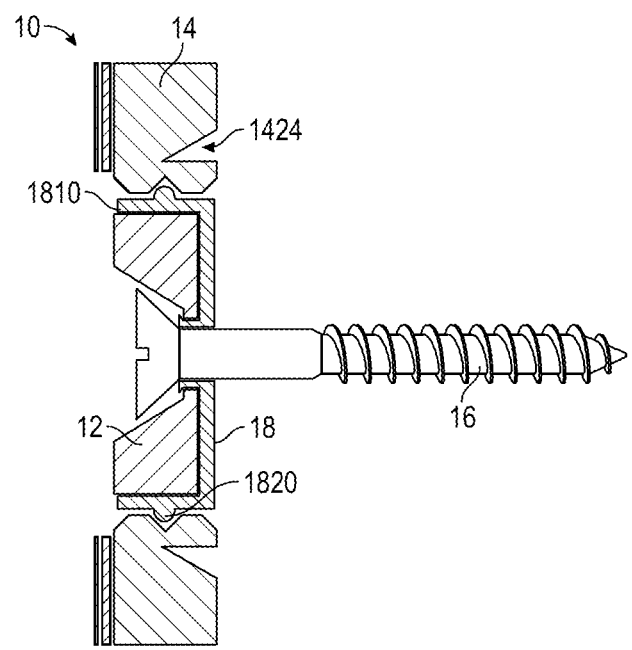
FIG. 33
FIG. 34

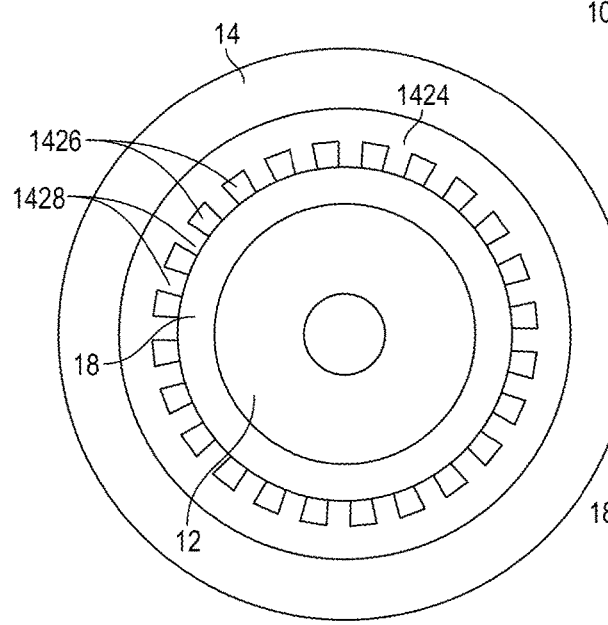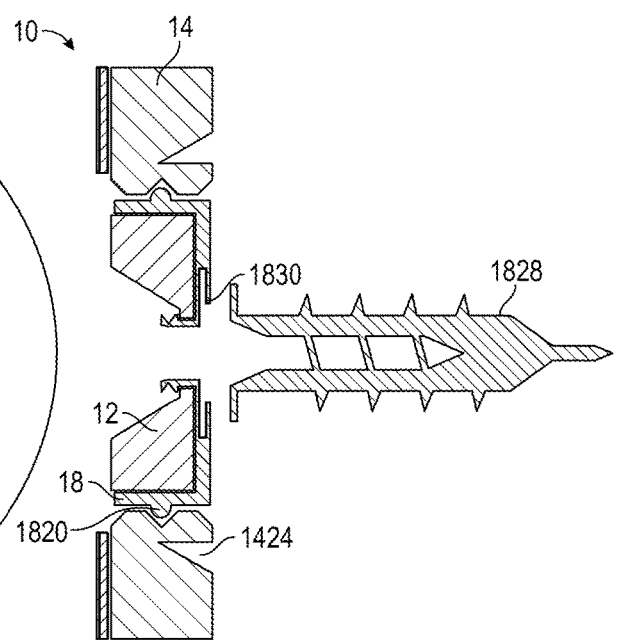
FIG. 44
FIG. 45

BACKSPLASH INSTALLATION HARDWARE

REFERENCE TO RELATED APPLICATION

This application claims the benefit of U.S. Provisional Application Ser. No. 63/027,862, titled "BACKSPLASH INSTALLATION HARDWARE" and filed May 20, 2020, the content of which is hereby incorporated by reference in its entirety.

BACKGROUND

A backsplash is widely used in residential and commercial settings including, for example, kitchens and bathrooms. Conventional installation of a backsplash generally involves permanently affixing the backsplash to a wall. For example, installation often requires applying mortar, laying tile, and applying grout. However, it may be necessary to remove at least one member of the backsplash when, for example, the surface of the backsplash is damaged or a user desires a different visual aesthetic. In such situations, removing or replacing the backsplash requires tremendous effort that is both time consuming and costly, and such backsplashes or other covering materials are not easily removed and replaced.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a coupling device includes an inner coupler and an outer coupler. The inner coupler and the outer coupler may be separably joined.

In some embodiments, the inner coupler and the outer coupler may be separably joined using a sleeve having a sidewall that extends between the inner coupler and the outer coupler. The sidewall may include a projection that fits into a groove on the outer coupler.

In some embodiments, the outer coupler may further include a series of teeth that extend between the outer coupler and the inner coupler. The series of teeth may flex away from the projection when the sidewall is inserted between the inner coupler and the outer coupler.

In some embodiments, the outer coupler includes an asymmetrical ratchet configuration. The sidewall may further include at least one pawl that engages the asymmetrical ratchet configuration to allow rotation of the outer coupler in a single direction.

In some embodiments, the outer coupler includes a symmetrical ratchet configuration. The sidewall may further include a pawl that engages the symmetrical ratchet configuration to prevent rotation of the outer coupler.

In some embodiments, the sleeve includes at least one receptacle for attaching a fastener to the coupling device to prevent rotation.

In some embodiments, the sleeve may further include a wall anchor.

In some embodiments, the outer coupler includes a lip that extends between the outer coupler and the inner coupler.

According to certain embodiments, a coupling device may include a first coupler and second coupler. The first coupler may include an attachment on a first surface and the second coupler may include an attachment means on the second surface. The first coupler and the second coupler may be separably joined.

In some embodiments, the first coupler and the second coupler are separably joined using a sleeve having an sidewall that extends between the first coupler and the second coupler. The sidewall may include a projection that snap-fits into a groove on the second coupler.

In some embodiments, the second coupler may include a lip that extends between the second coupler and the first coupler.

In some embodiments, the coupler may further include a series of teeth that extends between the second coupler and the first coupler. The coupling device may further include a projection that engages with the series of teeth when the first coupler is rotated.

According to certain embodiments, a method of releasably installing a cover material to a support material includes using a coupling device. The coupling device may include a first coupler having an attachment means on a first surface and a second coupler having an attachment means on a second surface. The method may include attaching the attachment means of the first coupler to the support material and attaching the attachment means of the second coupler to the cover material.

According to various embodiments, a method of installing a cover material to a support material includes using a coupling device. The coupling device may include a first coupler and a second coupler. The method may include attaching the first coupler to the support material and attaching the second coupler to the cover material.

According to some embodiments, a method of detaching a cover material attached to a support material with a coupling device having a first coupler and a second coupler may include pulling the cover material away from the support material and disengaging the second coupler from the first coupler so that the second coupler remains attached to the cover material and the first coupler remains attached to the support material.

According to certain embodiments, a method of attaching a replacement cover material to a support material may include joining a replacement second coupler to a first coupler, exposing an attachment means on a surface of the second coupler, and attaching the attachment means to the replacement cover material. The first coupler may be attached to the support material.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 1 is a front view of a coupling device comprising an inner coupler and an outer coupler that is shaped to partially surround the inner coupler, according to certain embodiments of the present invention.

FIG. 2 is a side view of the coupling device of FIG. 1.

FIGS. 9A-C are sectional views of the coupling device of FIG. 6.

FIG. 15 is a sectional view of the outer coupler and sleeve of FIG. 14 combined with an inner coupler taken along line 15-15 in FIG. 14.

FIG. 16 is a sectional view of the outer coupler and sleeve of FIG. 14 combined with an inner coupler and a fastener according to certain embodiments.

FIG. 25 is a sectional view of the outer coupler and the sleeve of the coupling device of FIG. 24 taken along line 25-25 in FIG. 24.

FIG. 26 is a sectional view of the outer coupler and sleeve of FIG. 24 combined with an inner coupler and a fastener and having a thinner narrow portion of a central bore of the inner coupler according to certain embodiments.

FIG. 33 is a sectional view of the coupling device of FIG. 32.

FIG. 34 is a sectional view of the coupling device of FIG. 32 combined with a fastener according to certain embodiments.

FIG. 44 is a front view of the coupling device of FIG. 17 combined with an attachable wall anchor having an asymmetrical head design that engages with a slot on the sleeve according to certain embodiments.

FIG. 45 is a sectional view of the coupling device of FIG. 44.

DETAILED DESCRIPTION

Figure 3:
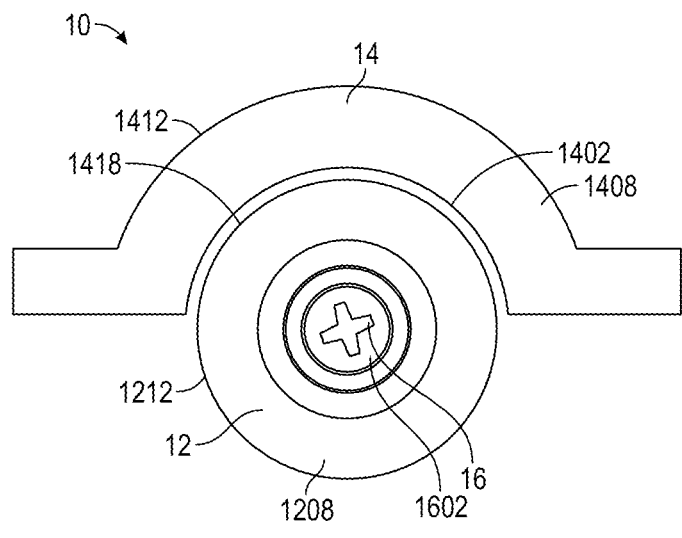
FIG. 3 is another front view of the coupling device of FIG. 1.
Figure 4:
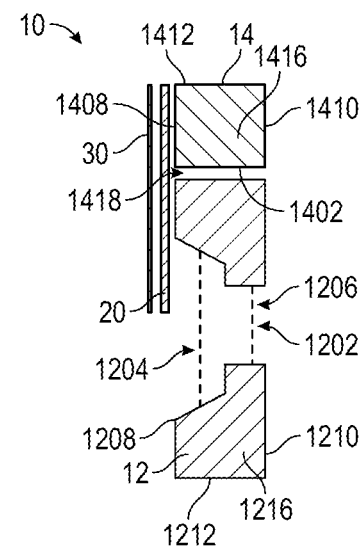
FIG. 4 is a sectional view of a portion of the coupling device of FIG. 1.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," "back," and "corners," among others, are intended to refer to the orientation as illustrated and described in the figure (or figures) to which the components and directions are referencing.

Disclosed herein are systems and methods for supporting a cover material to a support material using a coupling device, including installing and uninstalling the cover material from the support material. In some embodiments, the cover material may be, but does not have to be, a backsplash, including but not limited to a backsplash for a kitchen and/or a bathroom in a residential and/or commercial setting. In other embodiments, the cover material may be other cover materials and/or at other locations as desired. The coupling devices described herein may include a first coupler and a second coupler that may allow for the cover material to be installed on a support material (e.g., a wall, stud, frame, or other support material as desired), detached from the support material, and/or replaced on the support material as desired.

According to certain embodiments, and as illustrated in FIG. 1, for example, a coupling device 10 includes an inner coupler 12 (also referred to herein as a "first" coupler) and an outer coupler 14 (also referred to herein as a "second" coupler).

The inner coupler 12 may be formed of any suitably strong magnetic material, including but not limited to temporary magnets, permanent magnets, and/or electromagnets. Suitably strong permanent magnets may include, but are not limited to, rare-earth magnets such as neodymium iron boron (NdFeB) magnets and samarium-cobalt (SmCo) magnets, non-rare-earth magnets such as alnico (AlNiCo) magnets and ceramic or ferrite magnets, and any combination of rare-earth magnet elements and/or non-rare-earth magnet elements such as aluminum, nickel, cobalt, copper, iron (including iron ores such as magnetite), gadolinium, dysprosium, and/or titanium. As used herein, a suitably strong magnet may have a magnetic flux density that is greater than 0.5 tesla. In some embodiments, the magnetic flux density of a suitably strong magnetic material may be in the range of 0.5 to 1 tesla. In other embodiments, the magnetic flux density of a suitable strong magnetic material may be in the range of 0.5 to 1.4 tesla. In other embodiments, the magnetic flux density may be greater than 1 tesla, such as be greater than 1.4 tesla. Although expressed in teslas (T), it is the intention that the concept of "magnetic strength" encompass not only magnetic induction or magnetic flux density (measured in T, or Newton-meters per ampere), but also magnetic field intensity or magnetic field strength (measured in amperes per meter) and pull force (measured in pounds-force per square inch or Newtons per square meter), depending upon whichever is most appropriate for a given context.

Figure 9A:
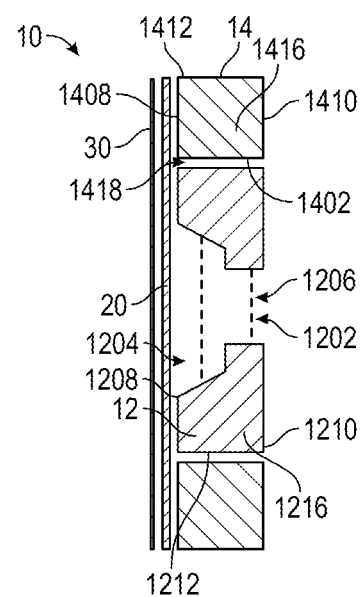

In some embodiments, and as illustrated in FIG. 9A, for example, the inner coupler 12 includes a body 1216 having an exterior contact surface 1208, an interior contact surface 1210, and an exterior side 1212. In some embodiments, the exterior side 1212 may be arranged approximately orthogonal to and extending between the contact surfaces 1208 and 1210, although it need not in other embodiments. In some embodiments, the body 1216 is monolithic or integrally formed, and the exterior contact surface 1208 and the interior contact surface 1210 may be opposite sides of the same material. In other embodiments, the body 1216 is not a monolithic structure and instead includes a plurality of sub-components, features, or materials between the surfaces 1208, 1210. Such other materials positioned between the surfaces 1208, 1210 may include, but are not limited to, stacked magnetic materials or non-magnetic materials, which may be used to, among other things, reduce costs, provide greater structural integrity, increase field strength or pull force, or shield magnetic fields. In embodiments where the body 1216 is not monolithic, the contact surfaces 1208, 1210 may be connected by fasteners, adhesive, laminate, thermal direct joining, frictional force, or other means as desired with other materials positioned between the contact surfaces 1208, 1210 to form a solid, hollow, or framed structure as desired.

Figure 23:
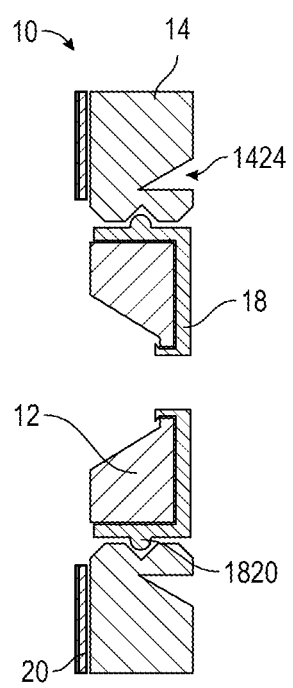
FIG. 23 is another sectional view of the coupling device of FIG. 17 taken along line 23-23 in FIG. 22.
Figure 24:
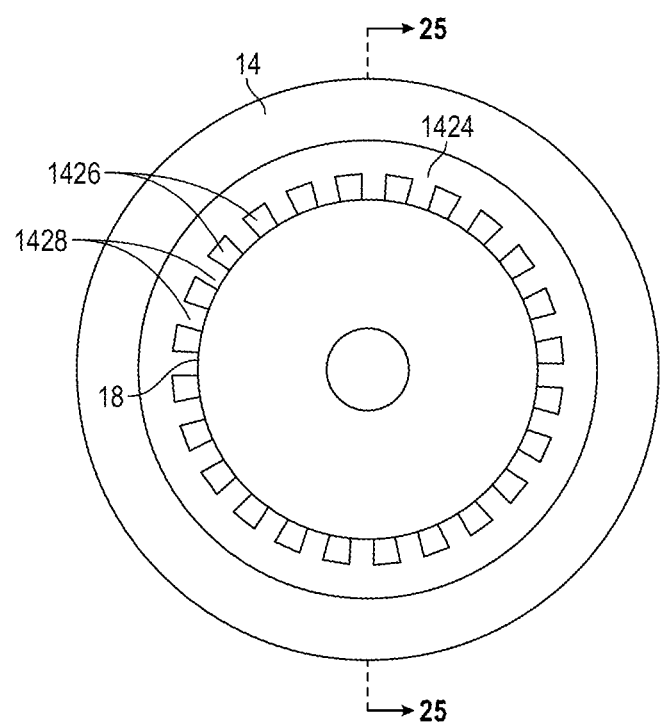
FIG. 24 is a front view of the outer coupler and the sleeve of the coupling device of FIG. 22 according to certain embodiments.
Figure 27:
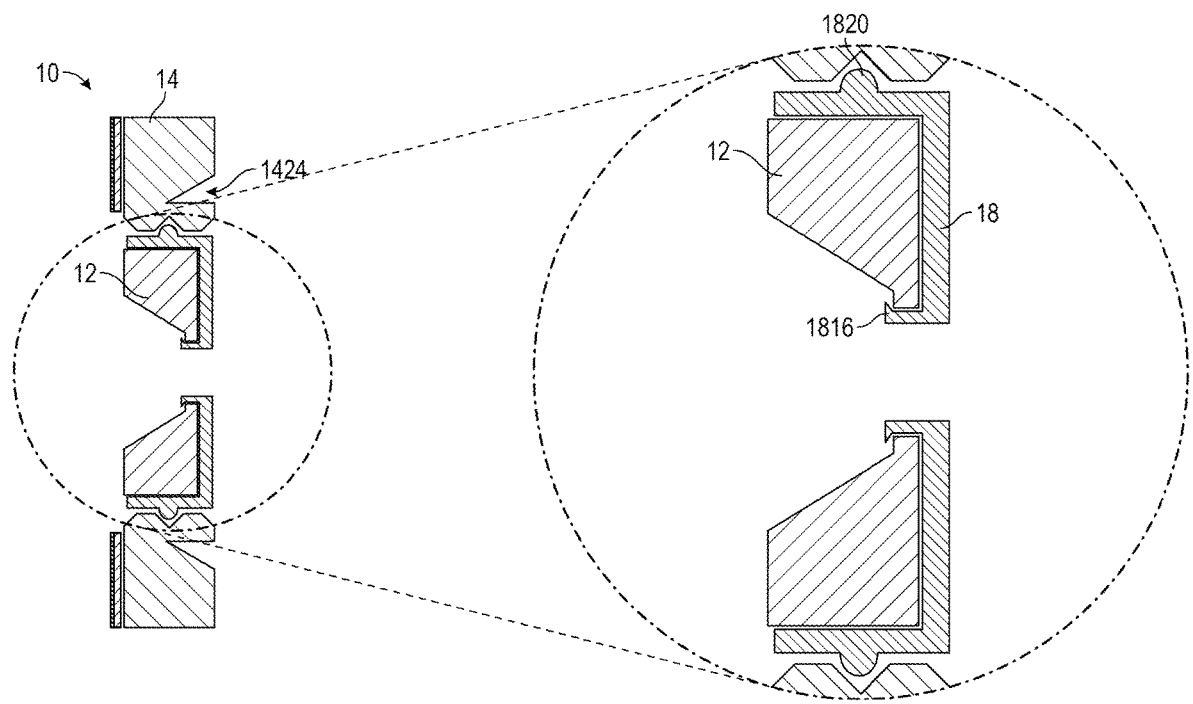
FIG. 27 is a sectional view showing an expanded view of the location of a lip covering a portion of the inner coupler according to certain embodiments.

A central bore 1202 may extend through a central region of the inner coupler 12. The central bore 1202 may optionally include a wider portion 1204 and a narrower portion 1206; however, the particular shape or profile of the central bore 1202 should not be considered limiting. As some non-limiting examples, FIGS. 9B and 23 illustrate inner couplers 12 with central bores 1202 having different shapes or profiles compared to that illustrated in FIG. 9A. In certain embodiments, the wider portion 1204 may optionally be located at an end of the central bore 1202 that corresponds to the exterior contact surface 1208. In contrast, in such embodiments, the narrower portion 1206 may optionally be located at an end of the central bore 1202 that corresponds to the interior contact surface 1210.

In further embodiments, and as best shown in FIG. 9B, the central bore 1202 may optionally include two wider portions 1204A, 1204B with the narrower portion 1206 positioned between the two wider portions 1204A, 1204B. In these embodiments, the wider portion 1204A may be located at an end of the central bore 1202 that corresponds to the exterior contact surface 1208, and the other wider portion 1204B may be located at an end of the central bore 1202 that corresponds to the interior contact surface 1210. In certain embodiments, as best shown in FIG. 9C, a filler 1214 may optionally be positioned within the wider portion 1204B as a support piece to reduce the possibility of or prevent the narrower portion 1206 from being crushed or broken when a fastener 16 is tightened against the inner coupler 12.

In certain embodiments, and as best shown in FIGS. 1-10, 13, 15-16, 18, 21-23, 26, 29-42, and 44-45, the outer coupler 14 includes an exterior contact surface 1408, an interior contact surface 1410, an interior side 1402, and an exterior side 1412. In certain embodiments, the exterior side 1412 of the outer coupler 14 may be positioned in a location opposing the location of the interior side 1402. In some embodiments, the exterior contact surface 1408 and the interior contact surface 1410 may be arranged approximately orthogonal to and extending between the sides 1402, 1412, although they need not in other embodiments. In some embodiments, outer coupler 14 is monolithic or integrally formed, and the exterior contact surface 1408 and the interior contact surface 1410 may be opposite sides of the same material. In other embodiments, the outer coupler 14 is not a monolithic structure and instead includes a plurality of sub-components, features, or materials between the surfaces 1408, 1410. In such embodiments, the contact surfaces 1408 and 1410 may be connected by fasteners, adhesive, laminate, thermal direct joining, frictional force, or other means with other materials positioned between the contact surfaces 1408, 1410 to form a solid, hollow, or framed structure. In certain embodiments, the outer coupler 14 may be formed of any suitable material or combinations of material including but not limited to plastics and other polymers, ceramics, composites, and metals, including, but not limited to, polytetrafluoroethylene (PTFE), acrylonitrile butadiene styrene (ABS), acetal, nylon, polyester, and polypropylene.

The outer coupler 14 includes a receiving area 141 that may receive at least a portion of the inner coupler 12. In certain embodiments, the receiving area 141 may have a shape or profile that is complimentary to a shape or profile of the inner coupler 12. In certain embodiments, and as illustrated in FIGS. 1-5, for example, the receiving area 141 is "open" and does not have a closed perimeter. In such embodiments, the outer coupler 14 may not completely surround the inner coupler 12. In other embodiments, and as illustrated in FIGS. 6-46, the receiving area 141 may be "closed" or have a closed perimeter, and the inner coupler 12 may be positioned within the closed perimeter. In such embodiments, the outer coupler 14 may surround the inner coupler 12. Regardless of whether the receiving area 141 is open or closed, when the outer coupler 14 is assembled with the inner coupler 12, the outer coupler 14 may be positioned proximate to at least a portion of the exterior side 1212 of the inner coupler 12. In this manner, the interior side 1402 of the outer coupler 14 may positioned proximate to at least a portion of the exterior side 1212 of the inner coupler 12.

Figure 11:
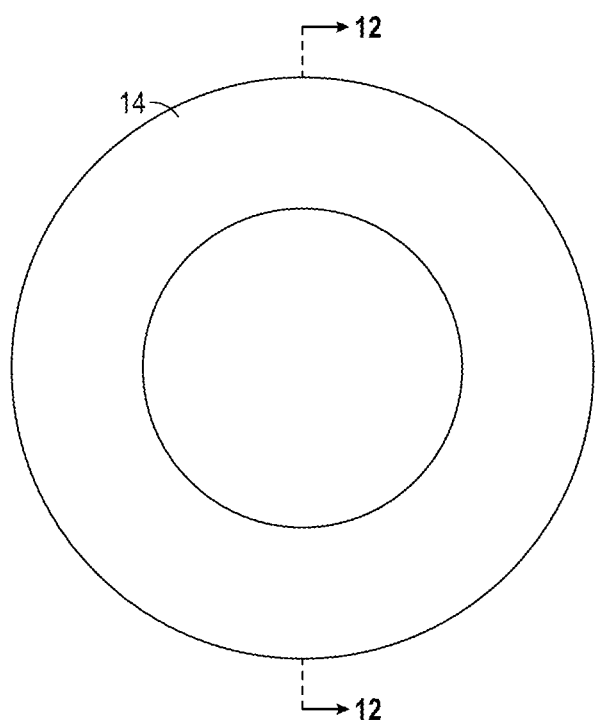
FIG. 11 is a front view of an outer coupler comprising a lip, according to certain embodiments of the present invention.
Figure 12:
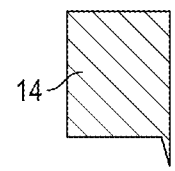
FIG. 12 is a sectional view of the outer coupler of FIG. 11 taken along line 12-12 in FIG. 11.
Figure 13:
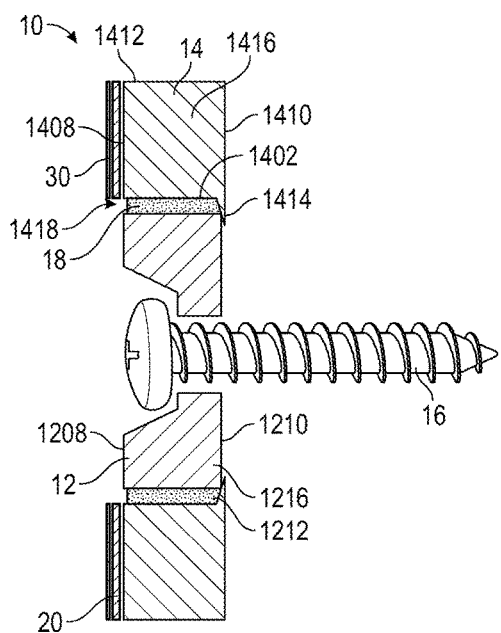
FIG. 13 is a sectional view of the outer coupler of FIG. 11 combined with an inner coupler according to certain embodiments.
Figure 14:
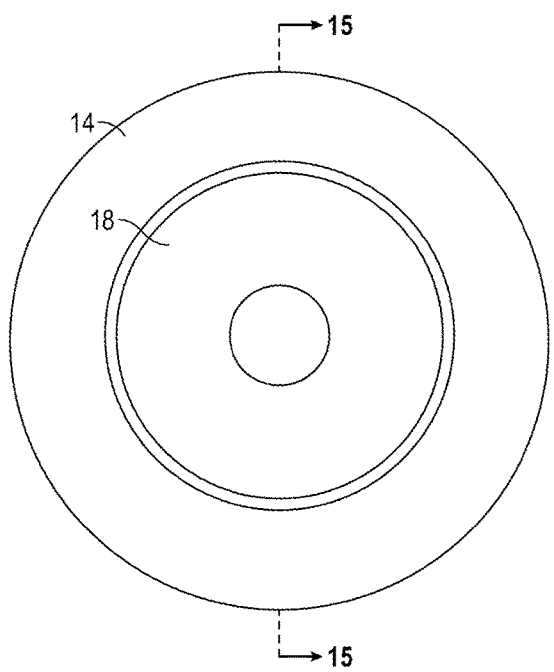
FIG. 14 is a front view of an outer coupler combined with a sleeve, according to certain embodiments of the present invention.
Figure 17:
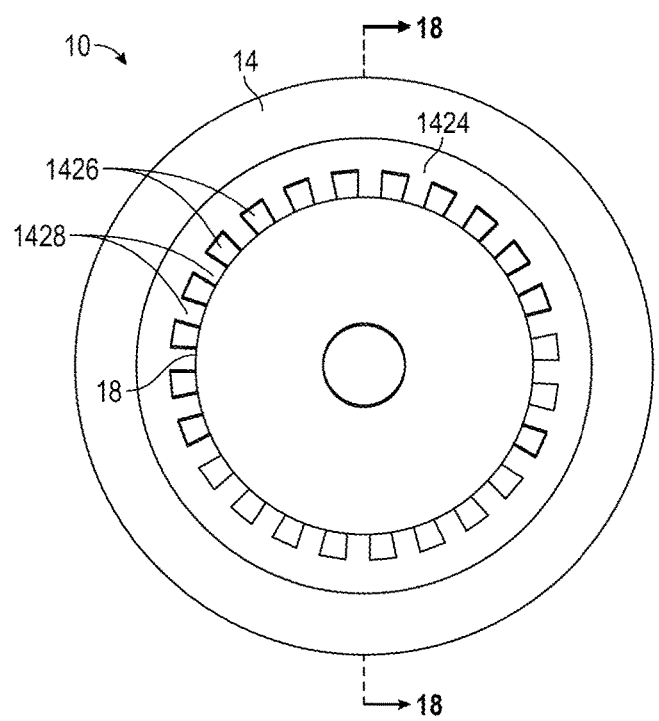
FIG. 17 is a front view of a coupling device comprising an inner coupler and an outer coupler joined by a sleeve, the outer coupler having a flexible notch and a series of flexible teeth that flex when a projection on the sleeve is inserted between the inner coupler and the outer coupler, according to certain embodiments of the present invention.
Figure 18:
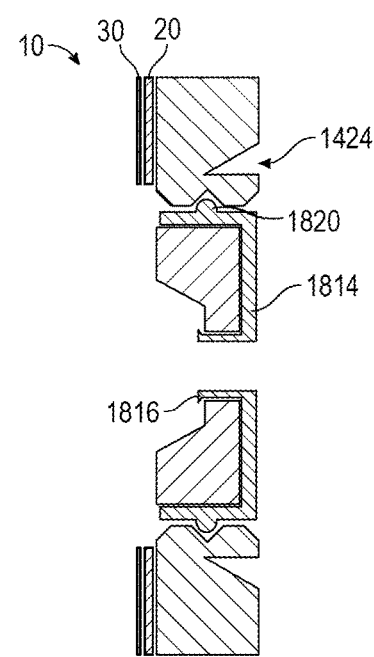
FIG. 18 is a sectional view of the coupling device of FIG. 17 taken along line 18-18 in FIG. 17.
Figure 19:
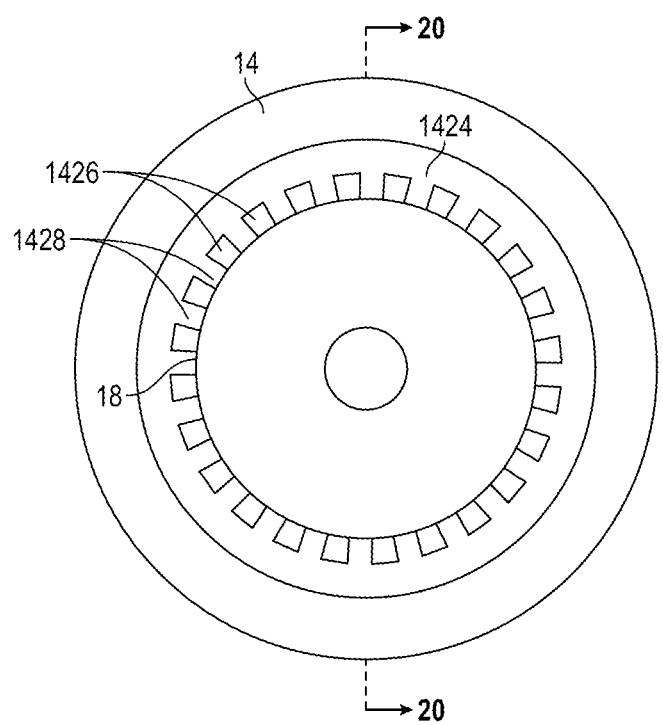
FIG. 19 is a front view of the outer coupler and the sleeve of the coupling device of FIG. 17 according to certain embodiments.
Figure 20:
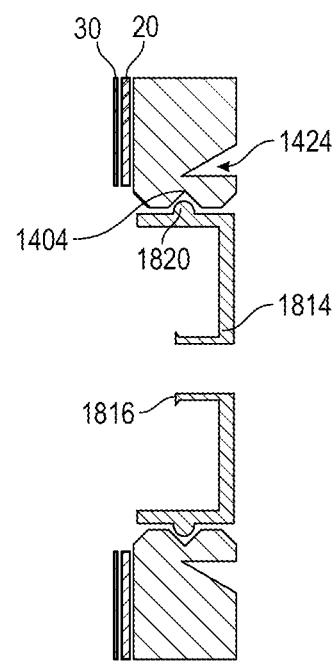
FIG. 20 is a sectional view of the outer coupler and the sleeve of the coupling device of FIG. 17 taken along line 20-20 in FIG. 19.
Figure 21:
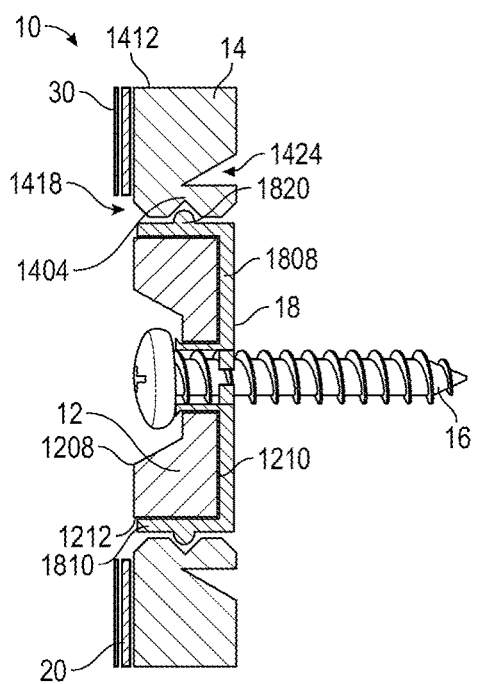
FIG. 21 is another section view of the coupling device of FIG. 17 taken along line combined with a fastener according to certain embodiments.
Figure 22:
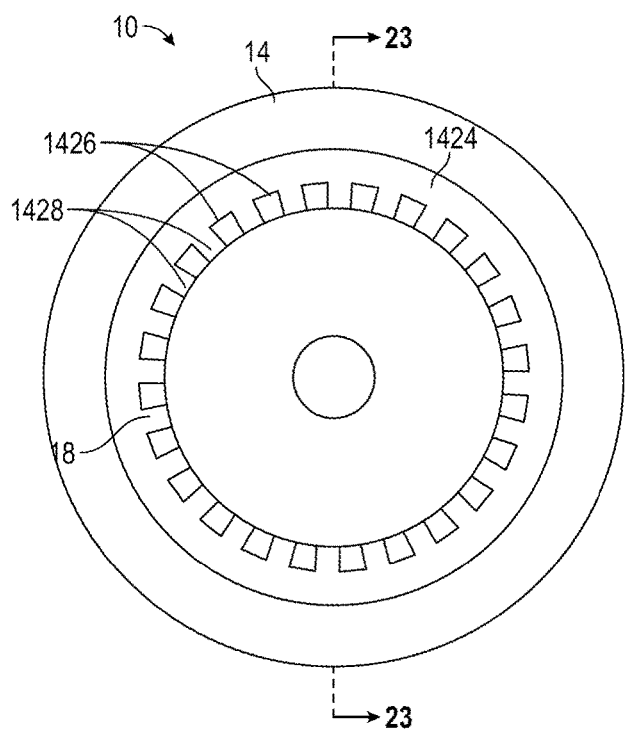
FIG. 22 is another front view of the coupling device of FIG. 17 according to certain embodiments.

In certain embodiments, and as illustrated in FIGS. 11-13, the outer coupler 14 optionally includes a lip 1414 that extends down on the interior contact surface 1410 to at least partially overlap the interior contact surface 1210 of the inner coupler 12. In such embodiments, the lip 1414 may extend inwards from the interior side 1402 in a direction opposite from the exterior side 1412. In these embodiments, the overlapping lip 1414 may assist with maintaining a desired spacing or gap 1418 between the interior side 1402 of the outer coupler 14 and the exterior side 1212 of the inner coupler 12. In certain embodiments, the gap 1418 may have a width of 1/16 inch, although in other embodiments the gap 1418 may have other widths as desired, including less than or greater than 1/16 inch. In some embodiments, the size of the gap 1418 may optionally only be limited by the mechanical limitations associated with creating the lip 1414 with a suitably small overlap with the interior contact surface 1210 of the inner coupler 12. In some embodiments, in addition to or as an alternative to the lip 1414, an adhesive means or other space-filling material may be within the gap 1418.

Figure 5:
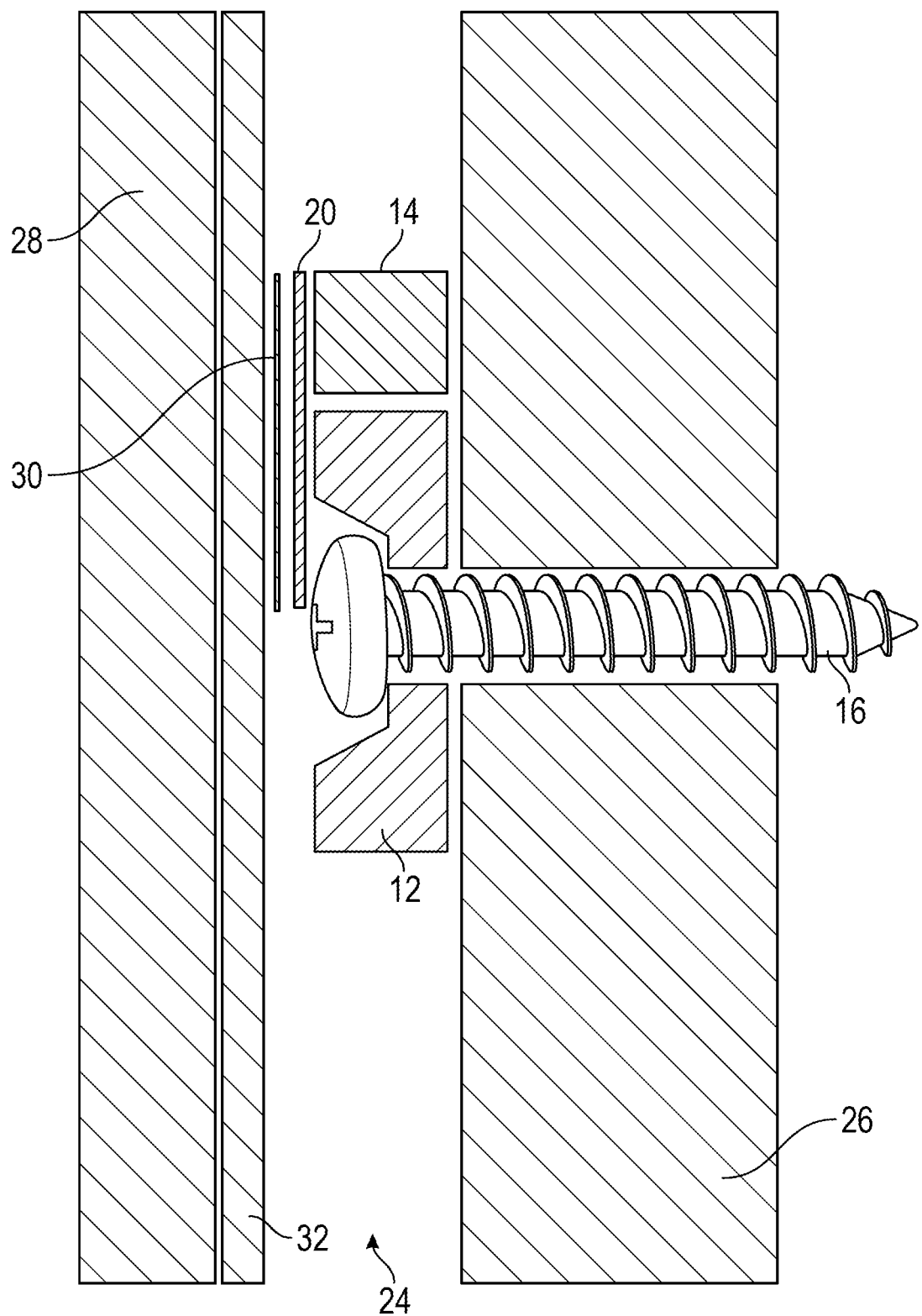
FIG. 5 is a sectional view of the coupling device of FIG. 1 installed with a cover material and a support material according to certain embodiments.
Figure 6:
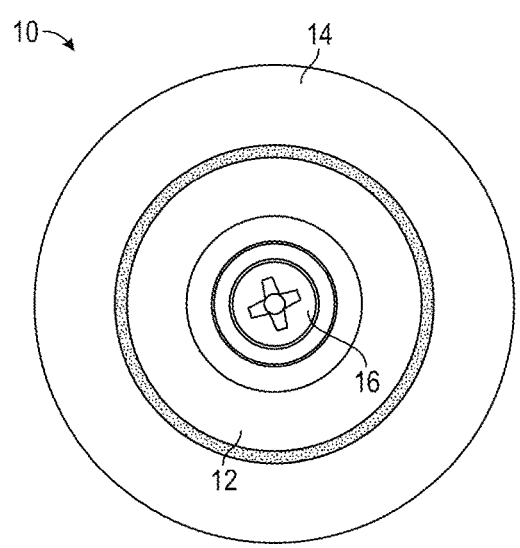
FIG. 6 is a front view of a coupling device comprising an inner coupler and an outer coupler that is shaped to fully surround the inner coupler, according to certain embodiments of the present invention.
Figure 7:
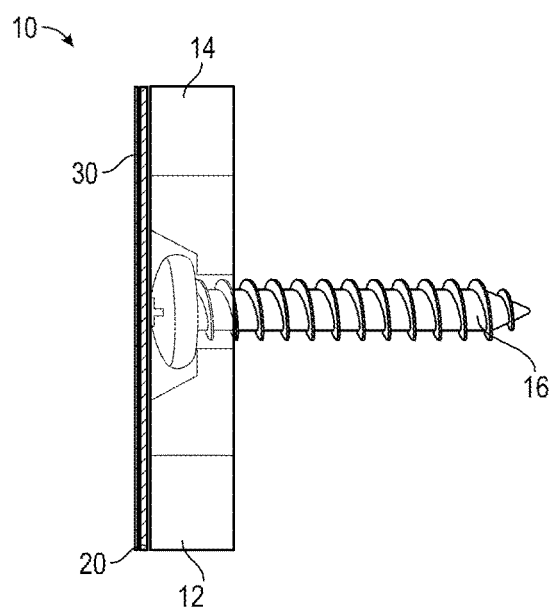
FIG. 7 is a side view of the coupling device of FIG. 6.
Figure 8:
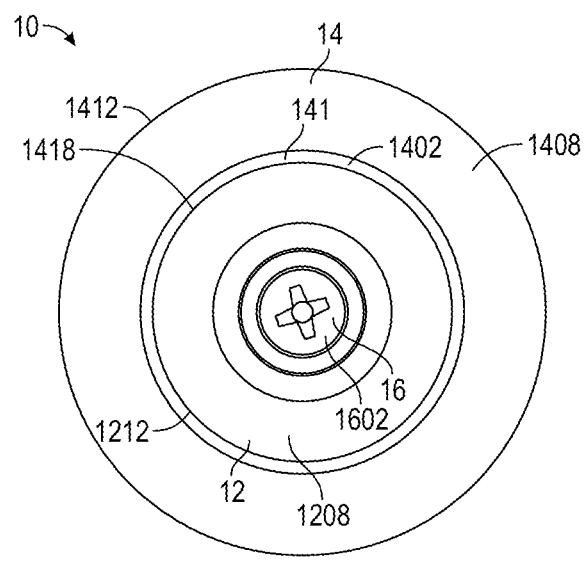
FIG. 8 is another front view of the coupling device of FIG. 6.
Figure 10:
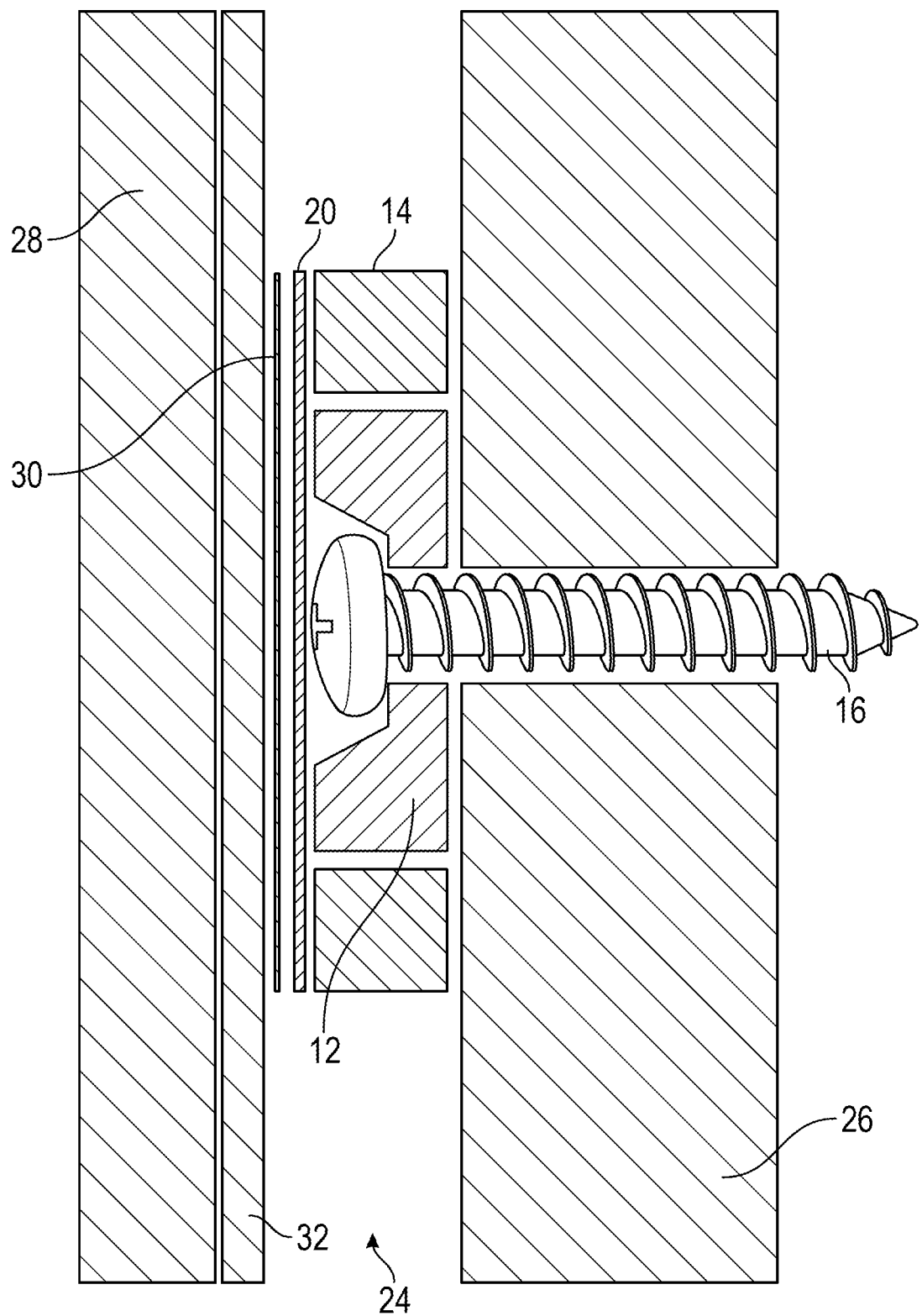
FIG. 10 is a sectional view of the coupling device of FIG. 6 installed with a cover material and a support material.

In certain embodiments, and as best illustrated in FIGS. 12, 15, 18, 20, 23, and 25, the exterior side 1212 of the inner coupler 12 may optionally have a width as small as 1/4 inch to 3/16 inch (wherein "width" in this context is defined as the direction extending between the exterior contact surface 1208 and the interior contact surface 1210). Similarly, the exterior side 1412 may optionally have a width as small as 1/4 inch to 3/16 inch (wherein "width" is defined as the direction extending between the exterior contact surface 1408 and the interior contact surface 1410). However, depending on the application, the exterior side 1212 may have a width as small as 0.50 mm to 0.85 mm. In other embodiments, the width of the exterior side 1212 and/or the width of the exterior side 1412 may be various widths as desired. In some cases, it may be desirable to reduce the width of exterior sides 1212, 1412 as much as possible to minimize a potential spacing 24 extending between a cover material 28 (e.g., a backsplash or other cover material as desired) and a support material 26 (e.g., a stud, wall, frame, and/or other support material as desired) that are attached to one another via the coupling device 10, as best illustrated in FIGS. 5 and 10 and as described in more detail below. In various embodiment, the minimum width of a given type of magnet may be affected by various considerations, such as the number of magnets, type of magnets, and pull force requirements taking into account, among other things, the placements and materials involved. As a non-limiting example, a 1/50 inch (0.50 mm) rubber magnet sheet may have a 0.31 PSI (2,137.38 N/m$^2$) pull force rating with respect to vertical placement on a smooth, flat steel plate of specified thickness, and a 1/4 inch (6.35 mm) neodymium disc magnet may have a 12.43 PSI (85,701.83 N/m$^2$) pull force rating with respect to the same placement and material, either of which may or may not be suitable for a given application.

In certain embodiments, as best illustrated in FIGS. 14-46, a sleeve 18 may optionally be included with the coupling device 10. The sleeve 18 may include a base 1808 and/or sidewall 1810. FIG. 13 illustrates the sleeve 18 with just the sidewall 1810, and FIGS. 16-46 illustrate the sleeve 18 with the base 1808 and the sidewall 1810. When included, the base 1808 may have a contact surface, which may be positioned proximate to the interior contact surface 1210 of the inner coupler 12. When included, the sidewall 1810 may be may be at least positioned within the gap 1418. The sidewall 1810 may extend from the base 1808 when the sleeve 18 includes both the base 1808 and the sidewall 1810.

In some embodiments, as best shown in FIGS. 15-16, 18, 20-21, 23, 25-28, 30-31, 33-34, 36-37, 39-40, 42, and 45, the sidewall 1810 optionally includes a projection 1820 on an exterior surface of the sidewall 1810 and that extends outwards from the sidewall 1810. In such embodiments, the outer coupler 14 may be secured to the sleeve 18 (and thus to the inner coupler 12) when the projection 1820 is positioned within a groove 1404 that is located on the interior side 1402 of the outer coupler 14. The shape or profile of the groove 1404 and/or the projection 1820 should not be considered limiting.

In embodiments with the projection 1820 and the groove 1404, in order to allow the projection 1820 to reach the groove 1404, some flexibility may be needed to allow the gap 1418 to expand as the projection 1820 travels through it.

In some embodiments, as best shown in FIGS. 15-16, the flexibility may be provided between the sidewall 1810 and the exterior side 1212 of the inner coupler 12. As one non-limiting example, a small space may be present between the sidewall 1810 and the exterior side 1212 of the inner coupler. In this example, as the sidewall 1810 is pressed into the gap 1418, the projection 1820 may cause the sidewall 1810 to bend toward the inner coupler 12 until the sidewall 1810 reaches the groove 1404. At that point, the projection 1820 may then snap into the groove 1404 thereby allowing the sidewall 1810 to return to its unbent position. In certain embodiments, once the sleeve 18 has joined with the groove 1404, the inner coupler 12 is joined to the outer coupler 14 to form the coupling device 10.

In other embodiments, as best shown in FIGS. 17-26, 29-42, and 44-45, the flexibility may be provided between the sidewall 1810 and the interior side 1402 of the outer coupler 14. As one non-limiting example, a portion of the interior side 1402 that interacts with the projection 1820 may be separated into a series of teeth 1426 that extend around the circumference of the interior side 1402 of the outer coupler 14. Each tooth 1426 may be separated from an adjacent tooth 1426 by a gap 1428. The teeth 1426 may also be separated from the remainder of the outer coupler 14 above the teeth 1426 by a notch 1424. The notch 1424 may extend around the circumference of the outer coupler 14 between the teeth 1426 and the remainder of the outer coupler 14 above the teeth 1426. The combination of the notch 1424 and the gaps 1428 may provide the teeth 1426 with more flexibility to bend toward the notch 1424 until the sidewall 1810 reaches the groove 1404. At that point, the projection 1820 may then snap into the groove 1404 and allows the teeth 1426 to return to their unbent positions. In certain embodiments, once the sleeve 18 has joined with the groove 1404, the inner coupler 12 is joined to the outer coupler 14 to form the coupling device 10.

Figure 29:
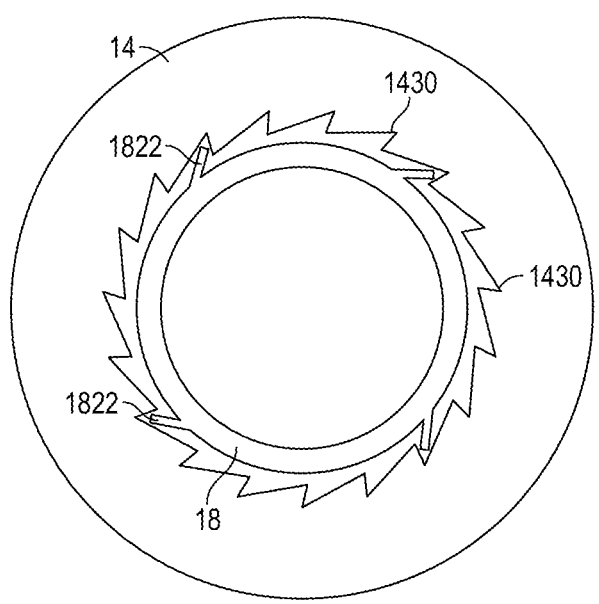
FIG. 29 is a front view of a coupling device comprising an inner coupler and an outer coupler joined by a sleeve, the outer coupler comprising an asymmetrical ratchet configuration that engages with a pawl on the sleeve to permit one-directional rotation of the outer coupler, according to certain embodiments of the present invention.
Figure 30:
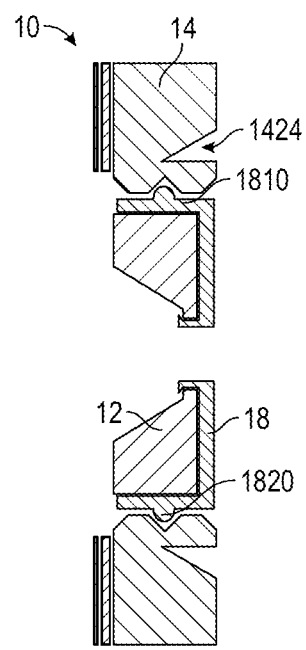
FIG. 30 is a sectional view of the coupling device of FIG. 29.
Figure 31:
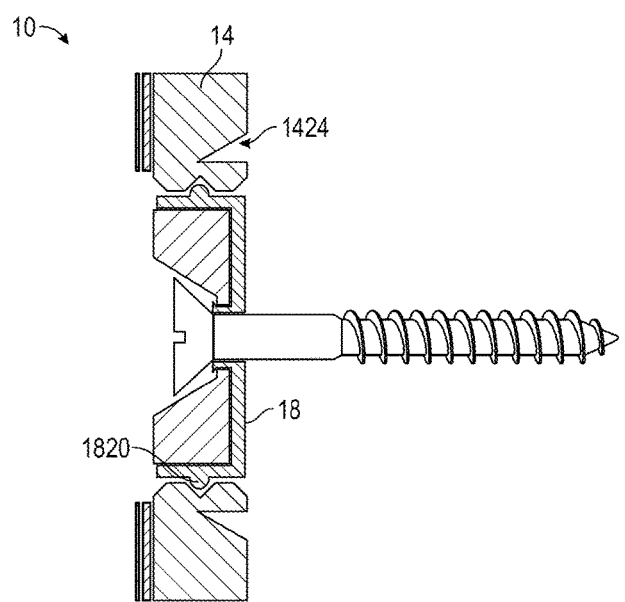
FIG. 31 is a sectional view of the coupling device of FIG. 29 combined with a fastener according to certain embodiments.
Figure 32:
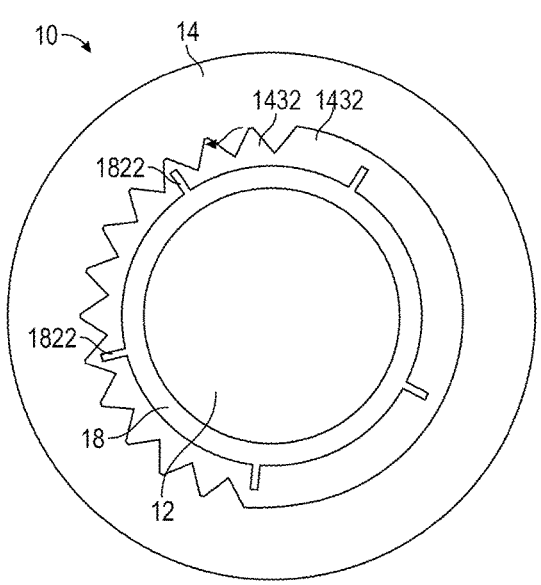
FIG. 32 is a front view of a coupling device comprising an inner coupler and an outer coupler joined by a sleeve, the outer coupler comprising a symmetrical ratchet configuration that engages with a pawl on the sleeve to prevent rotation of the outer coupler, according to certain embodiments of the present invention.
Figure 35:
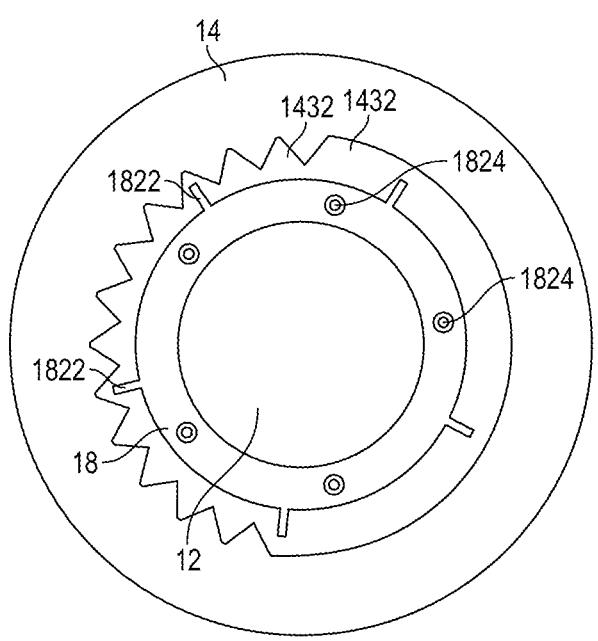
FIG. 35 is a front view of the coupling device of FIG. 32 with receptacles for additional fasteners to prevent rotation of the sleeve/outer coupler according to certain embodiments.
Figure 36:
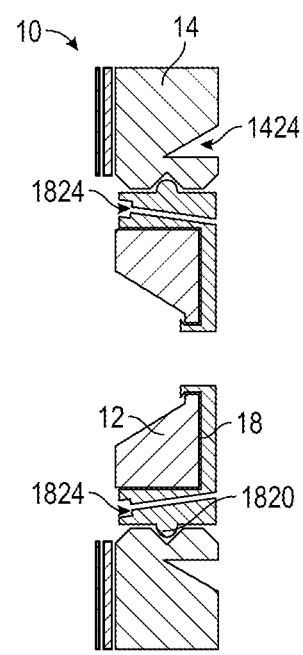
FIG. 36 is a sectional view of the coupling device of FIG. 35.
Figure 37:
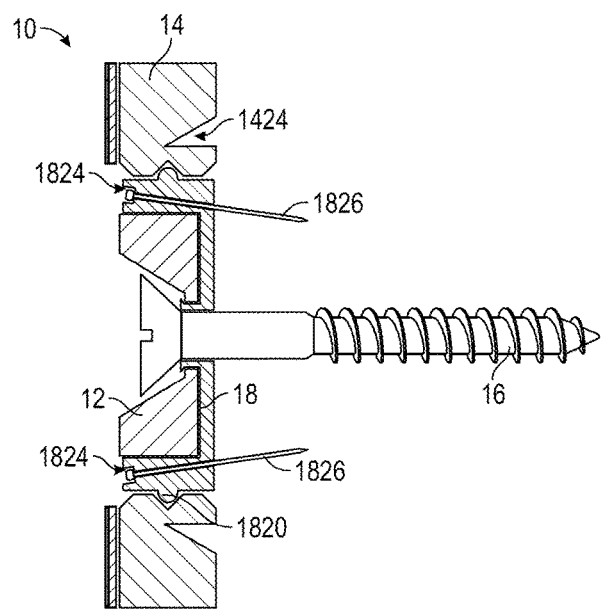
FIG. 37 is a sectional view of the coupling device of FIG. 35 combined with a fastener and additional fasteners through the receptacles according to certain embodiments.

In other embodiments, as shown in FIGS. 29-31, the snap fit concept between the sleeve 18 and the outer coupler 14 may include a ratchet concept to prevent rotation of the outer coupler 14 relative to the sleeve 18/inner coupler 12 in one direction. In these embodiments, the teeth 1426 and/or the interior side 1402 may be configured with an asymmetrical ratchet configuration 1430. The asymmetrical ratchet configuration may permit one or more pawls 1822 to travel over the asymmetrical ratchet configuration 1430 in one direction, while locking the pawl 1822 into place when the pawl 1822 attempts to travel over the asymmetrical ratchet configuration 1430 in the opposite direction.

In yet other embodiments, as shown in FIGS. 32-40, the snap fit concept between the sleeve 18 and the outer coupler 14 may include a ratchet concept to prevent bi-directional rotation of the outer coupler 14 relative to the sleeve 18/inner coupler 12. In these embodiments, the teeth 1426 and/or the interior side 1402 may be configured with a symmetrical ratchet configuration 1432. This symmetrical ratchet configuration 1432 permits one or more pawls 1822 to travel in both directions over the symmetrical ratchet configuration 1432 until the desired position is achieved. Once the desired position is achieved, the weight of the cover material 28 is released, which in turn presses the symmetrical ratchet configuration 1432 down over the upwardly-pointing pawls 1822. The outer coupler 14 is then locked into position relative to the sleeve 18/inner coupler 12. This type of locking arrangement may eliminate the need for finding the center when hanging the cover material 28 and, thus, assists with leveling the cover material 28.

In additional embodiments, as shown in FIGS. 35-40, one or more receptacles 1824 may be positioned through the sleeve 18. Once the proper location of the outer coupler 14 is determined, fasteners 1826 may be inserted through the receptacles 1824 to further secure the location of the outer coupler 14.

Figure 38:
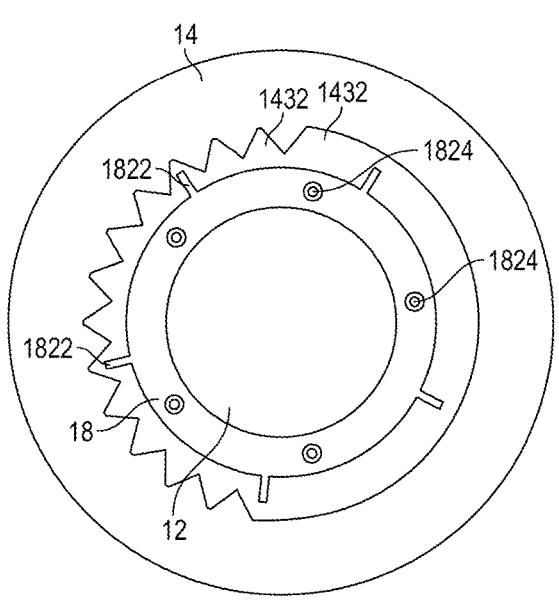
FIG. 38 is a front view of a coupling device of FIG. 35 combined with an integrally-attached wall anchor according to certain embodiments.
Figure 39:
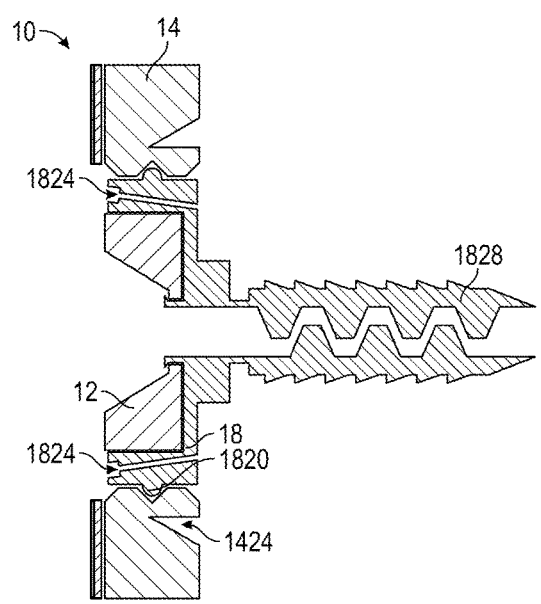
FIG. 39 is a sectional view of the coupling device of FIG. 38.
Figure 40:
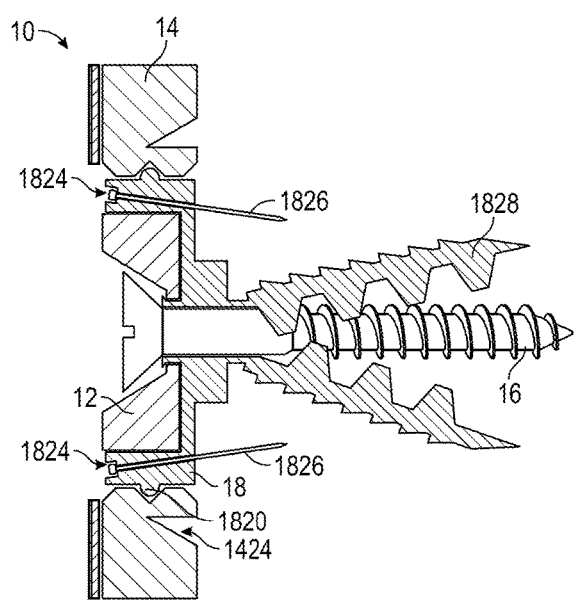
FIG. 40 is a sectional view of the coupling device of FIG. 38 combined with a fastener and additional fasteners through the receptacles according to certain embodiments.

In various embodiments, to further secure the inner coupler 12 to the support material 26, a wall anchor 1828 may optionally be connected to the base 1808 of the sleeve 18, as illustrated in FIGS. 38-46. The wall anchor 1828 may be integrally formed with the sleeve 18 (as illustrated in FIGS. 38-40) or may be separately attached to the sleeve 18 (as illustrated in FIGS. 41-46) as desired. The inclusion of the wall anchor 1828 allows the coupling device 10 to easily anchor into support material 26 (such as drywall) where there is no stud in alignment with the coupling device 10.

In embodiments where the wall anchor 1828 is separately joined to the sleeve 18, as illustrated in FIGS. 41-46, the geometry of the sleeve 18 may optionally be modified with a slot 1830 provided in the sleeve 18. In such embodiments, the wall anchor 1828 may be attached to the sleeve 18 by rotating and locking an asymmetrical head design 1832 into the slot 1830. The asymmetrical head design 1832 allows the wall anchor 1828 to rotate in one direction (e.g., clockwise) until the asymmetrical head design 1832 becomes wedged into the slot 1830. The asymmetrical head design 1832 could be rotated clockwise as the fastener 16 is rotated clockwise to secure the inner coupler 12 to the support material 26.

Figures 41, 42:
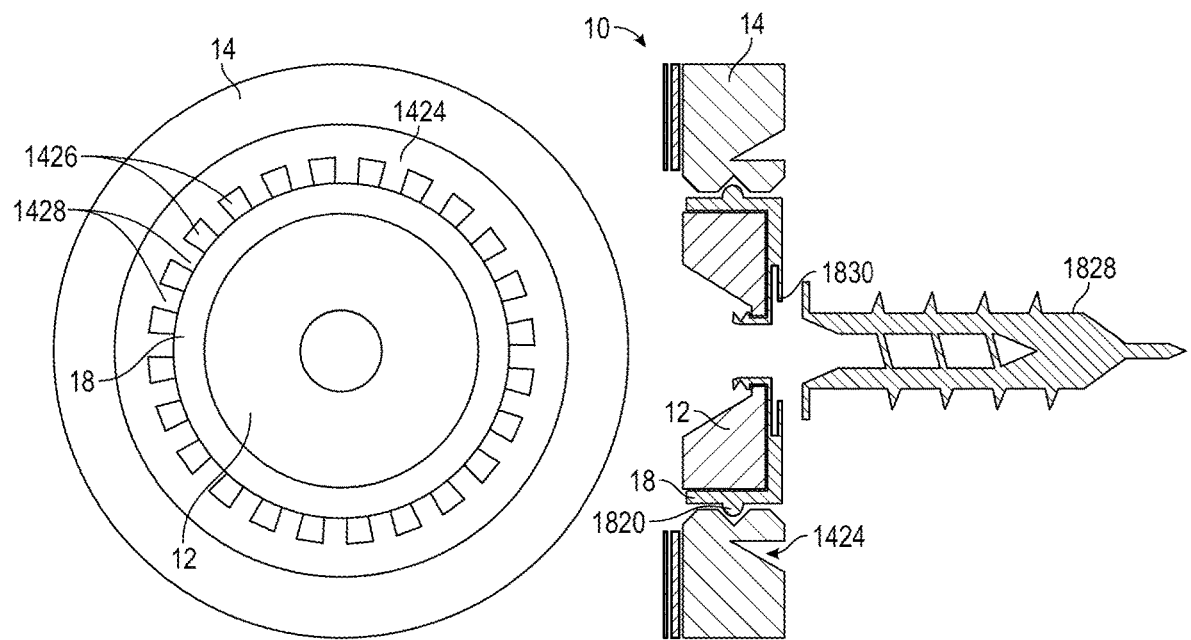
FIG. 41 is a front view of the coupling device of FIG. 17 combined with an attachable wall anchor having an asymmetrical head design that engages with a slot on the sleeve according to certain embodiments.
FIG. 42 is a sectional view of the coupling device of FIG. 41.
Figure 43:
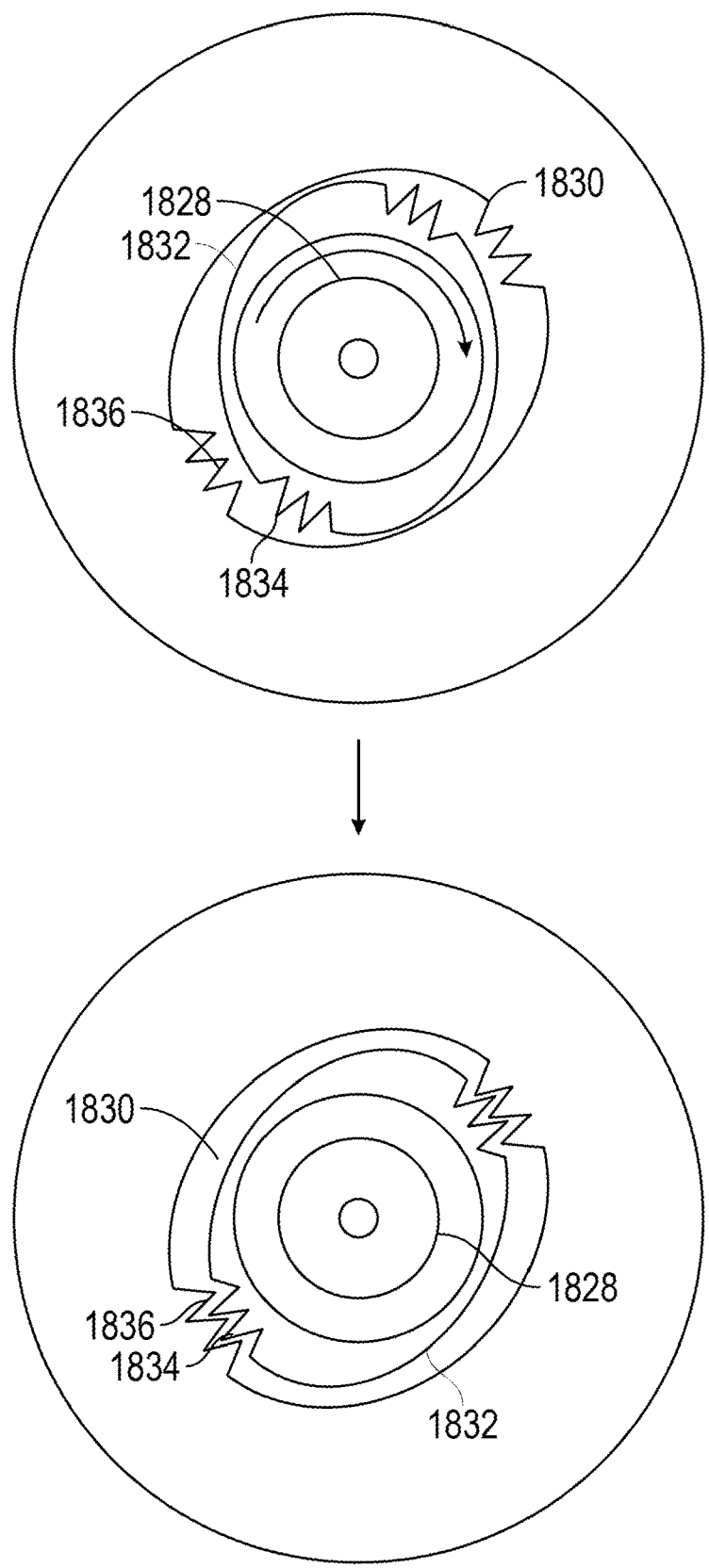
FIG. 43 is a front view of the asymmetrical head design of FIG. 41, which illustrates the rotation of the asymmetrical head design between a disengaged and an engaged position within the slot.

As illustrated in FIGS. 41-43, in some embodiments, the locking between the wall anchor 1828 and the slot 1830 may be accomplished by having saw teeth 1834 (or similar projections) on the wall anchor 1828 that engage with a corresponding set of saw teeth 1836 (or similar receptacles) on the slot 1830 when the wall anchor 1828 reaches the fully-wedged position.

Figure 46:
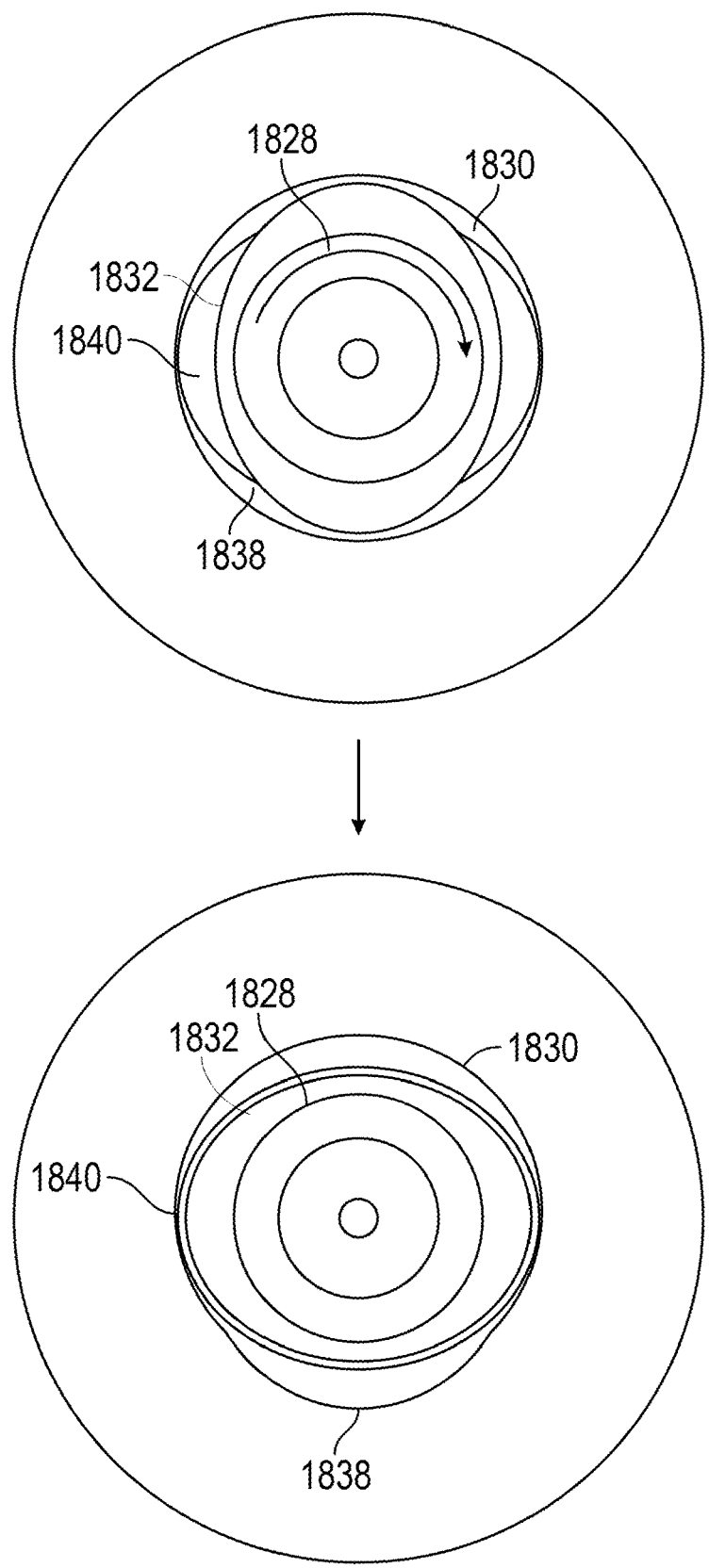
FIG. 46 is a front view of the asymmetrical head design of FIG. 41, which illustrates the rotation of the asymmetrical head design between a disengaged and an engaged position within the slot according to certain embodiments.

In further embodiments, as illustrated in FIGS. 44-46, the slot 1830 may have a tapered step 1838 inside the slot 1830. The tapered step 1838 may be configured so that the asymmetrical head design 1832 rotates within the slot 1830 and becomes continuously tighter until the asymmetrical head design 1832 reaches the step 1838, at which point the asymmetrical head design 1832 drops into a seat 1840 and is permanently held in place.

In further embodiments, the sleeve 18 may also include an inner sleeve 1814. The inner sleeve 1814, as best shown in FIGS. 18, 20-21, 23, and 25-39, may be positioned to overlap at least the narrower portion 1206 of the central bore 1202. The inner sleeve 1814 may serve as a protective mechanism for the inner coupler 12, which can be somewhat fragile in certain cases.

As best illustrated in FIGS. 17-39, to capture the inner coupler 12 and hold in place as part of the coupling device 10, the inner sleeve 1814 may optionally include a lip 1816 that wraps around a transition point between the narrower portion 1206 and the wider portion 1204 of the central bore 1202. Furthermore, the fastener head 1602 may optionally press against the lip 1816 when the fastener 16 is being tightened, as opposed to directly pressing against the surface of the inner coupler 12. In such embodiments, the force imparted by the fastener 16 while being tightened and the pressure imparted by the fastener 16 after tightening are transferred, to some extent (if not predominantly or entirely), to the sleeve 18 and not the inner coupler 12. This embodiment, particularly if the sleeve 18 is made of a smooth material (i.e., a material with a lower coefficient of friction, including but not limited to polytetranuoroethylene (PTFE), such as the material sold under the name Teflon® by Chemours), serves to reduce friction while tightening and allows for the application of greater torque and higher axial loads on the faster 16 without exposing the inner coupler 12 to damage from tightening. Although this embodiment contemplates that the lip 1816 and the sleeve 18 are unitary, the same result may be achieved with separate components. As a non-limiting example, a fastener washer (not shown) may be used, instead of or in addition to, the lip 1816 to direct force and pressure away from the inner coupler 12 and toward the sleeve 18. Such a washer may be flat, cone-shaped, or have any other shape as desired (and may or may not have protrusions) capable of engaging with the sleeve 18 to accomplish such result. Such engagement may occur at the lip 1816, the inner sleeve 1814, and/or the sidewall 1810.

Alternatively or additionally, a fastener washer made of rubber (or some other material with a suitable coefficient of friction) may be used to increase friction between the fastener head 1602 and the inner coupler 12 (and/or the sleeve 18), which may, among other things, prevent or minimize or reduce loosening and avoid galvanic corrosion.

Figure 28:
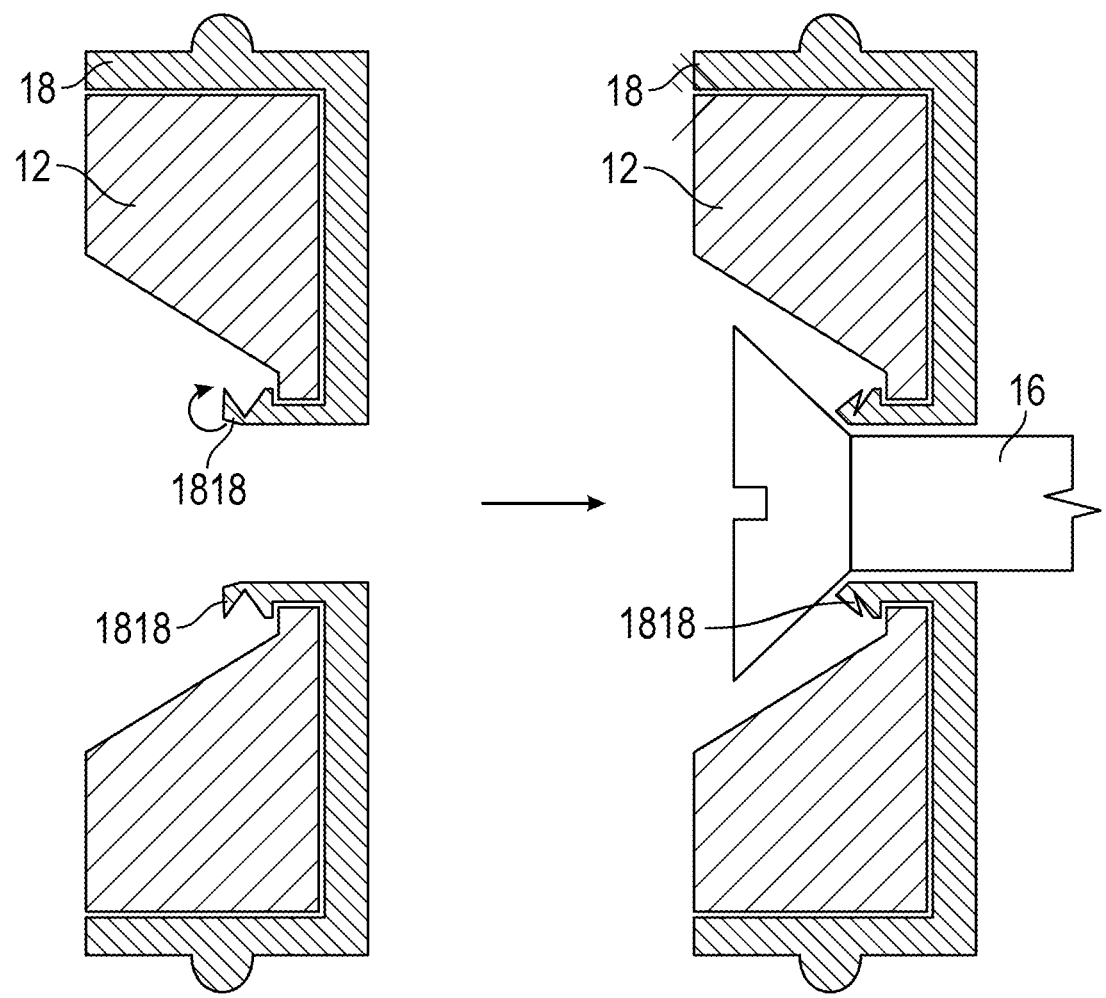
FIG. 28 is a sectional view showing a crumple zone addition to the lip of FIG. 28 in an uncrushed and crushed position according to certain embodiments.

As a means to further limit the amount of pressure that is placed directly onto the inner coupler 12 by the fastener 16, a frangible component 1818 may optionally be included between the fastener head 1602 and the lip 1816. As best illustrated in FIG. 28, in these embodiments, the frangible component 1818 may deform (e.g., collapse or crumble) when the fastener 16 has been overly tightened and will deform before the inner coupler 12 is damaged. The crumple zone of the frangible component 1818 may audibly or haptically crack or collapse to provide feedback to the installer to reduce the amount of torque being applied to the fastener 16 before damage is inflicted on the inner coupler 12.

In order to use the coupling device 10 to attach the cover material 28 to the support material 26, as illustrated in FIGS. 5 and 10, for example, an attachment means 20 may be applied to at least the exterior contact surface 1408. In some embodiments, the attachment means 20 may be applied to at least the exterior contact surface 1208. In yet other embodiments, the attachment means 20 may be applied to at least the exterior contact surface 1208 and the exterior contact surface 1408. In some embodiments, the attachment means 20 may include any suitable adhesive that is slow acting and/or suitably strong. "Slow acting" may be defined as leaving sufficient time for corrective work and positioning but less than 24 hours to fully set and harden.

In certain embodiments, the cover material 28 may be formed of clear glass, translucent glass, opaque glass, porcelain, ceramic, metal, granite, marble, plastic, or other suitable material, including composites, to which the attachment means 20 may be attached. In some non-limiting embodiments, the cover material 28 may be a backsplash, although it need not be in other embodiments. The support material 26 may be formed of dry wall, wood, cork, plaster, acoustic tiles, cork, metal, or any other material to which an additional attachment means 20 and/or the fastener 16 may be attached. In embodiments where an attachment means 20 is used to attach the coupling device 10 to both the cover material 28 and an additional attachment means 20 is used to attach the coupling device 10 to the support material 26, the attachment means 20 used for the cover material 28 may be different from the additional attachment means 20 used for the support material 26, particularly where the differences between the material used for the cover material 28 and the material used for the support material 26 may not both be compatible with the same attachment means 20.

To attach a cover material 28 to a support material 26 using the coupling device 10, the coupling device 10 may be first attached to the support material 26 using the fastener 16 and/or an additional attachment means 20 that is applied to the interior contact surfaces 1210 and/or 1410. In some embodiments, the fastener 16 is inserted through the central bore 1202 of the inner coupler 12 and attached to the support material 26 in any suitable location that will support the weight of the cover material 28. As a non-limiting example, the coupling devices 10 may be attached to the support material 26 at stud locations or other reinforced locations of the support material 26. In some embodiments, the support material 26 may not be transparent or may have a non-transparent backing layer 32 (described below). In such embodiments, the placement options for the coupling device 10 are not limited by aesthetic concerns that, for example, may require coupling devices 10 to be confined to the edges of the support material 26 (which may or may not align with studs or other reinforcement and may or may not provide adequate structural support) or be located in a symmetrical, linear, or other visually-acceptable pattern (which, again, may or may not align with studs or other reinforcement and may or may not provide adequate structural support).

In some embodiments, a removable liner 30 may optionally be attached to the attachment means 20. Once the coupling devices 10 have been attached to the support material 26 with the fastener 16 and/or an additional attachment means 20, the removable liner 30 is removed from the attachment means 20 to expose the attachment means 20 located on the exterior contact surface 1208 and/or exterior contact surface 1408. The cover material 28 may be pressed into place against the coupling device(s) 10, and the attachment means 20 allows the cover material 28 to be shifted/adjusted until it is in a suitable location while the inner coupler 12 serves as the primary attachment means to join the cover material 28 to the support material 26. In any event, the inner coupler 12 should be sufficiently strong, given the coefficient of friction of the cover material 28 and the inner coupler 12, to hold the cover material 28 in place (i.e., to prevent or minimize unacceptable amounts of vertical displacement due to gravity) without additional support from a bracket or other mechanical connection devices at least while the attachment means 20 is drying and/or curing. Ultimately, the inner coupler 12 may remain as the primary attachment means while the outer coupler 14 prevents lateral movement and allows for ease of removal and re-installation of the cover material 28.

In certain instances when there is no concern about vertical movement, such as in the case of a backsplash that rests on a countertop, the inner coupler 12 may be sufficient for holding the cover material 28 in place against the support material 26 without the need for the attachment means 20. In other embodiments, an additional attachment means 20 applied to the interior contact surface 1410, along with the attachment means 20 applied to the exterior contact surface 1408, may be sufficient for holding the cover material 28 in place with respect to the support material 26.

Once the cover material 28 has been attached to the coupling device 10, the cover material 28 may be easily separated from the support material 26 by pulling against the cover material 28, which causes the connection between the outer coupler 14 and the inner coupler 12 to disengage. Once disengaged, the cover material 28 may be pulled away from the support material 26. As a result, the outer coupler 14 remains attached to the cover material 28, while the inner coupler 12 remains attached to the support material 26, allowing for easy re-installation of the cover material 28 by simply aligning the outer coupler 14 with the inner coupler 12 to re-engage. Such disengagement may be useful for things such as cleaning, accessing utilities (e.g., electrical wiring, lighting, plumbing, etc.), electronic devices, or structures for repair, replacement, or maintenance or hidden compartments (e.g., wall safes), installing new utilities, devices, or structures, protecting cover material 28 during renovations, swapping out one cover material 28 with another cover material 28 (as a retail establishment might do to reflect different seasonal periods), etc.

To install a new cover material to the existing support material 26, the installer attaches a new outer coupler 14 to the inner coupler 12. The new outer coupler 14 also includes a new attachment means 20 on the exterior contact surface 1408. The new cover material 28 is then pressed against the coupling device 10, and the attachment means 20 allows the cover material 28 to be shifted/adjusted until it is in a suitable location while the inner coupler 12 serves as the primary attachment means to join the cover material 28 to the support material 26. This type of reattachment could be useful for situations such as where a minor renovation is needed to replace a backsplash or other decorative cover material.

In certain instances, the cover material 28 optionally includes a backing layer 32 that may be formed of steel or other suitable material that can be attached and/or magnetically engaged to a magnet. The use of such a backing layer 32 may also provide an opaque surface to hide wiring or other unsightly connections that would otherwise be visible through non-opaque cover material 28. Another advantage of the backing layer 32 may be to provide additional protection for handlers of glass cover material 28 and others. As a non-limiting example, the backing layer 32 may hold the glass fragments together in the event that the cover material 28 is broken during transport and/or installation and/or service life, thus adding rigidity and preventing potential cuts to an installer or others.

In other embodiments, the use of an inner coupler 12 and a backing layer 32 may not be necessary. The cover material 28 itself may have an opaque backing layer etched or painted or otherwise applied to provide the same opacity to cover wiring and other undesirable attachment means so that a separate backing layer 32 is not needed to provide the opacity. For these embodiments, the inner coupler 12 may actually be formed of a non-magnet material, such as the material used to form the outer coupler 14. In these embodiments, an attachment means 20 is applied to the interior contact surface 1210.

In certain embodiments, such as a backsplash or other application where the cover material 28 is supported from below and vertical displacement due to gravity is not a concern, the attachment means 20 on the exterior contact surface 1408 may be used to attach the cover material 28 to the support material 26. For example, once the attachment means 20 is dried/cured to the interior contact surface 1210, the removable liner 30 is removed from the attachment means 20 on the exterior contact surface 1408 to expose the attachment means 20. The cover material 28 is pressed into place against the coupling device(s) 10, and the attachment means 20 allows the cover material 28 to be shifted/adjusted until it is in a suitable location.

In other embodiments where unacceptable amounts of vertical displacement due to gravity is a concern, the inner couplers 12 may be attached to the support material 26 via the attachment means 20 and allowed to dry/cure to the support material 26. The locations of the inner couplers 12 are transferred to the surface of the cover material 28 via measurements, markings, etc. The outer couplers 14 are then likewise attached to the cover material 28 at the marked locations via the attachment means 20 and allowed to dry/cure to the cover material 28. Once the two couplers have dried/cured to the respective surfaces, the cover material 28 is then pressed against the support material 26 so that the outer couplers 14 mate with the inner couplers 12. A person of ordinary skill in the art will understand that the process could be reversed by attached the outer couplers 14 first and then transferring the markings to the support material 26 or any other combination that suitably allows for the couplers to dry/cure to the surfaces prior to installing the cover material 28 to the support material 26. In certain embodiments, it may be desirable, as previously mentioned, to make the spacing 24 between the cover material 28 and the support material 26 as thin as possible. In other embodiments, it may be desirable to use the spacing 24 for running wiring or other items, such as backlighting, insulation, or other items behind the cover material 28. It is contemplated that the present invention may have a wide range of applications for securing objects, including, but not limited to, backsplashes, mirrors, artwork, portraits, mantels, bookshelves, furniture, electronic devices, etc., to surfaces.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A coupling device comprising: an inner coupler; and an outer coupler; wherein the inner coupler and the outer coupler are separably joined.

Illustration 2. The coupling device of any preceding or subsequent illustrations or combination of illustrations, wherein the inner coupler and the outer coupler are separably joined using a ring having an outer sleeve that extends between the inner coupler and the outer coupler.

Illustration 3. The coupling device of any preceding or subsequent illustrations or combination of illustrations, wherein the outer sleeve comprises a projection that snap-fits into a groove on the outer coupler.

Illustration 4. The coupling device of any preceding or subsequent illustrations or combination of illustrations, wherein the outer coupler comprises a series of teeth that extend between the outer coupler and the inner coupler.

Illustration 5. The coupling device of any preceding or subsequent illustrations or combination of illustrations, wherein the series of teeth flex away from the projection when the outer sleeve is inserted between the inner coupler and the outer coupler.

Illustration 6. The coupling device of any preceding or subsequent illustrations or combination of illustrations, wherein the outer coupler comprises an asymmetrical ratchet configuration.

Illustration 7. The coupling device of any preceding or subsequent illustrations or combination of illustrations, wherein the outer sleeve comprises at least one pawl that engages with the asymmetrical ratchet configuration to allow rotation of the outer coupler in a single direction.

Illustration 8. The coupling device of any preceding or subsequent illustrations or combination of illustrations, wherein the outer coupler comprises a symmetrical ratchet configuration.

Illustration 9. The coupling device of any preceding or subsequent illustrations or combination of illustrations, wherein the outer sleeve comprises at least pawl that engages with the symmetrical ratchet configuration to prevent rotation of the outer coupler.

Illustration 10. The coupling device of any preceding or subsequent illustrations or combination of illustrations, wherein the ring comprises at least one receptacle for attaching a fastener to the coupling device to prevent rotation.

Illustration 11. The coupling device of any preceding or subsequent illustrations or combination of illustrations, wherein the ring further comprises a wall anchor.

Illustration 12. The coupling device of any preceding or subsequent illustrations or combination of illustrations, wherein the wall anchor is integrally formed with the ring.

Illustration 13. The coupling device of any preceding or subsequent illustrations or combination of illustrations, wherein the wall anchor is attachable to the ring.

Illustration 14. The coupling device of any preceding or subsequent illustrations or combination of illustrations, wherein the wall anchor comprises an asymmetrical head design that interlocks with a slot on the ring.

Illustration 15. The coupling device of any preceding or subsequent illustrations or combination of illustrations, wherein the interlocking design comprises a set of mating devices that engage when the asymmetrical head has reached maximum rotation within the slot.

Illustration 16. The coupling device of any preceding or subsequent illustrations or combination of illustrations, wherein the interlocking design comprises a tapered slot with a step that the asymmetrical head passes over and into a seat when the asymmetrical head has reached maximum rotation within the slot.

Illustration 17. The coupling device of any preceding or subsequent illustrations or combination of illustrations, wherein the outer coupler comprises a lip that extends between the outer coupler and the inner coupler.

Illustration 18. A coupling device comprising: a first coupler comprising an attachment means on a first surface; and a second coupler comprising an attachment means on a second surface; wherein the first coupler and the second coupler are separably joined.

Illustration 19. The coupling device of any preceding or subsequent illustrations or combination of illustrations, wherein the first coupler and the second coupler are separably joined using a ring having an outer sleeve that extends between the first coupler and the second coupler.

Illustration 20. The coupling device of any preceding or subsequent illustrations or combination of illustrations, wherein the outer sleeve comprises a projection that snap-fits into a groove on the second coupler.

Illustration 21. The coupling device of any preceding or subsequent illustrations or combination of illustrations, wherein the second coupler comprises a lip that extends between the second coupler and the first coupler.

Illustration 22. The coupling device of any preceding or subsequent illustrations or combination of illustrations, further comprising a series of teeth that extend between the second coupler and the first coupler.

Illustration 23. The coupling device of any preceding or subsequent illustrations or combination of illustrations, further comprising a projection that engages with the series of teeth when the first coupler when the first coupler is rotated.

Illustration 24. A method of releasably installing a cover material to a support material using a coupling device, the coupling device comprising a first coupler comprising an attachment means on a first surface and a second coupler comprising an attachment means on a second surface, the method comprising: attaching the attachment means of the first coupler to the support material; and attaching the attachment means of the second coupler to the cover material.

Illustration 25. A method of releasably installing a cover material to a support material using a coupling device, the coupling device comprising an inner coupler and an outer coupler comprising an attachment means, the method comprising: attaching the inner coupler to the support material; and attaching the attachment means of the outer coupler to the cover material.

Illustration 26. A method of detaching a cover material from a support material, wherein the cover material is attached to the support material with a coupling device, the coupling device comprising an inner coupler and an outer coupler, the method comprising: pulling the cover material away from the support material; and disengaging the outer coupler from the inner coupler so that the outer coupler remains attached to the cover material and the inner coupler remains attached to the support material.

Illustration 27. A method of attaching a replacement cover material to a support material, the method comprising: joining a replacement outer coupler to an inner coupler, the magnet coupler attached to the support material; exposing an attachment means on a surface of the outer coupler; and attaching the attachment means to the replacement cover material.

Illustration 28. A method of releasably installing a cover material to a support material using a coupling device, the coupling device comprising a first coupler and a second coupler, the method comprising: attaching the first coupler to the support material; and attaching the second coupler to the cover material.

Illustration 29. A method of detaching a cover material from a support material, wherein the cover material is attached to the support material with a coupling device, the coupling device comprising a first coupler and a second coupler, the method comprising: pulling the cover material away from the support material; and disengaging the second coupler from the first coupler so that the second coupler remains attached to the cover material and the first coupler remains attached to the support material.

Illustration 30. A method of attaching a replacement cover material to a support material, the method comprising: joining a replacement second coupler to a first coupler, the first coupler attached to the support material; exposing an attachment means on a surface of the second coupler; and attaching the attachment means to the replacement cover material.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:
1. A coupling device for supporting a cover material to a support material, the coupling device comprising:
   an inner coupler;

an outer coupler, wherein the outer coupler comprises an exterior contact surface, and wherein the inner coupler and the outer coupler are separably joined; and attachment means on the exterior contact surface of the outer coupler and configured to engage the cover material, wherein the attachment means comprises an adhesive strip on the exterior contact surface of the outer coupler, wherein the cover material comprises a backsplash.

2. The coupling device of claim 1, wherein the inner coupler and the outer coupler are separably joined using a sleeve having a sidewall that extends between the inner coupler and the outer coupler.

3. The coupling device of claim 2, wherein the sidewall comprises a projection that snap-fits into a groove on the outer coupler.

4. The coupling device of claim 3, wherein the outer coupler comprises a series of teeth that extend between the outer coupler and the inner coupler, and wherein the series of teeth flex away from the projection when the sidewall is inserted between the inner coupler and the outer coupler.

5. The coupling device of claim 2, wherein the outer coupler comprises an asymmetrical ratchet configuration, and wherein the sidewall comprises at least one pawl that engages with the asymmetrical ratchet configuration to allow rotation of the outer coupler in a single direction.

6. The coupling device of claim 2, wherein the outer coupler comprises a symmetrical ratchet configuration, and wherein the sidewall comprises at least pawl that engages with the symmetrical ratchet configuration to prevent rotation of the outer coupler.

7. The coupling device of claim 2, wherein the sleeve comprises at least one receptacle for attaching a fastener to the coupling device to prevent rotation.

8. The coupling device of claim 2, wherein the sleeve further comprises a wall anchor.

9. The coupling device of claim 1, wherein the outer coupler comprises a lip that extends between the outer coupler and the inner coupler.

10. The coupling device of claim 1, wherein the adhesive strip is a slow acting adhesive allowing a positioning of the cover material to be adjusted after initial engagement with the adhesive strip while setting and hardening in less than 24 hours.

11. A coupling device for supporting a cover material to a support material, the coupling device comprising:

a first coupler comprising a first exterior contact surface;

a second coupler comprising a second exterior contact surface, wherein the first exterior contact surface and the second exterior contact surface face a same direction; and attachment means on the first exterior contact surface and the second exterior contact surface, wherein the attachment means comprises an adhesive strip on the first exterior contact surface and the second exterior contact surface, wherein the first coupler and the second coupler are separably joined, and wherein the first coupler and the second coupler are separably joined using a sleeve having a sidewall that extends between the first coupler and the second coupler.

12. The coupling device of claim 11, wherein the sidewall comprises a projection that snap-fits into a groove on the second coupler.

13. The coupling device of claim 11, wherein the second coupler comprises a lip that extends between the second coupler and the first coupler.

14. The coupling device of claim 11, further comprising a series of teeth that extend between the second coupler and the first coupler.

15. The coupling device of claim 14, further comprising a projection that engages with the series of teeth when the first coupler when the first coupler is rotated.

16. The coupling device of claim 11, wherein the sleeve further comprises a wall anchor.

17. A coupling device for supporting a cover material to a support material, the coupling device comprising:

a first coupler comprising a first exterior contact surface;

a second coupler comprising a second exterior contact surface, wherein the first exterior contact surface and the second exterior contact surface face a same direction; and attachment means on the first exterior contact surface and the second exterior contact surface, wherein the attachment means comprises an adhesive strip on the first exterior contact surface and the second exterior contact surface, wherein the first coupler and the second coupler are separably joined, and at least one of:

the second coupler comprises a lip that extends between the second coupler and the first coupler; or a series of teeth extend between the second coupler and the first coupler.

* * * * *